United States Patent
Seregin et al.

(10) Patent No.: US 11,496,771 B2
(45) Date of Patent: Nov. 8, 2022

(54) REFERENCE PICTURE LIST AND COLLOCATED PICTURE SIGNALING IN VIDEO CODING

(71) Applicant: QUALCOMM Incorporated, San Diego, CA (US)

(72) Inventors: Vadim Seregin, San Diego, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/181,876

(22) Filed: Feb. 22, 2021

(65) Prior Publication Data

US 2021/0266600 A1 Aug. 26, 2021

Related U.S. Application Data

(60) Provisional application No. 62/980,695, filed on Feb. 24, 2020.

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/174* (2014.11);
(Continued)

(58) Field of Classification Search
CPC .... H04N 19/70; H04N 19/105; H04N 19/174; H04N 19/176; H04N 19/46; H04N 19/503; H04N 19/52
See application file for complete search history.

(56) References Cited

U.S. PATENT DOCUMENTS

2013/0268621 A1* 10/2013 Mese ............... H04N 19/17
709/217
2013/0272375 A1 10/2013 Yu et al.
(Continued)

OTHER PUBLICATIONS

Samuelsson et al. (Joint Video Experts Team (JVET) of ITU-T SG 16 WP 3 and ISO/IEC JTC 1/SC 29/WG 11 17th Meeting: Brussels, BE, Jan. 7-17, 2020, AHG9: On Picture Header). This is an IDS document and is therefore not provided in this office action. (Year: 2020).*

(Continued)

*Primary Examiner* — Richard A Hansell, Jr.
(74) *Attorney, Agent, or Firm* — Shumaker & Sieffert, P.A.

(57) ABSTRACT

A video decoder may be configured to receive, in response to receiving a first syntax element indicating that reference picture list information is included in a picture header syntax structure, a second syntax element in the picture header syntax structure indicating whether a collocated picture used for temporal motion vector prediction is to be derived from a first reference picture list or a second reference picture list; receive a slice of the video data that refers to the picture header syntax structure; and in response to the slice being a P slice, set a value for a third syntax element associated with the slice to a first value for the third syntax element, with the first value for the third syntax element indicating that the collocated picture used for temporal motion vector prediction is to be derived from the first reference picture list.

26 Claims, 8 Drawing Sheets

(51) Int. Cl.
  *H04N 19/174* (2014.01)
  *H04N 19/46* (2014.01)
  *H04N 19/176* (2014.01)
  *H04N 19/503* (2014.01)
(52) U.S. Cl.
  CPC ........... *H04N 19/176* (2014.11); *H04N 19/46* (2014.11); *H04N 19/503* (2014.11)

(56) References Cited

U.S. PATENT DOCUMENTS

| | | | |
|---|---|---|---|
| 2013/0336407 A1 | 12/2013 | Chen et al. | |
| 2015/0023423 A1* | 1/2015 | Zhang | H04N 19/51 375/240.12 |
| 2021/0195179 A1* | 6/2021 | Coban | H04N 19/70 |
| 2021/0368208 A1* | 11/2021 | Samuelsson | H04N 19/46 |

OTHER PUBLICATIONS

Bross et al. (Joint Video Experts Team (JVET) of ITU-T SG 16 WP3 and ISO/IEC JTC I/SC 29/WG11 17th Meeting Brussels, BE, Jan. 7-17, 2020, Versatile Video Coding Draft 8). This is an IDS document and is therefore not provided in this office action. (Year: 2020).*

Bross B., et al., "Versatile Video Coding (Draft 8)," 17th JVET Meeting, Jan. 7, 2020-Jan. 17, 2020, Brussels, (The Joint Video Exploration Team of ISO/IEC JTC1/SC29/WG11 and ITU-TSG. 16), No. JVET-Q2001-vB, m5290527 Jan. 2020 (Jan. 27, 2020), XP030224290, 523 Pages, Retrieved from the Internet: URL:http://phenix.int-evry.fr/jvet/doc_end_user/documents/17_Brussels/wg11/JVET-Q2001-v11.zip JVET-Q2001-vB.docx [retrieved on Jan. 27, 2020].

Bross B., et al., "Versatile Video Coding (Draft 8)," JVET-Q2001-vC, Joint Video Experts Team (JVET) of ITU-T SG 16 WP 3 and ISO/IEC JTC 1/SC 29/WG 11, 17th Meeting: Brussels, BE, Jan. 7-17, 2020, JVET-Q2001, Feb. 9, 2020 (Feb. 9, 2020), XP030285388, 512 pages, Retrieved from the Internet: URL: http://phenix.int-evry.fr/jvet/doc_end_user/documents/17_Brussels/wg11/JVET-Q2001-v13.zip. JVET-Q2001-vC.docx [retrieved on Feb. 9, 2020].

International Search Report and Written Opinion—PCT/US2021/019244—ISA/EPO—dated Jun. 4, 2021, 17 pp.

ITU-T H.265: "Series H: Audiovisual and Multimedia Systems Infrastructure of Audiovisual Services—Coding of Moving Video High Efficiency Video Coding," The International Telecommunication Union, Jun. 2019, 696 Pages.

Samuelsson (Sharplabs) J., et al., "AHG9: On Picture Header," 17. JVET Meeting; Jan. 7, 2020-Jan. 17, 2020; Brussels; BE; (The Joint Video Exploration Team of ISO/IEC JTC1/SC29/WG11 and ITU-T SG.16 WP 3), No. JVET-Q0259; m51854, Dec. 31, 2019 (Dec. 31, 2019), 10 Pages, XP030222998, Retrieved from the Internet: URL: http://phenix.int-evry.fr/jvet/doc_end_user/documents/17_Brussels/wg11/JVET-Q0259-v1.zip JVET-Q0259.docx [retrieved on Dec. 31, 2019].

Seregin (Qualcomm) V., et al., "AHG9: On Reference Picture List Signalling," 18th Meeting; by Teleconference, Apr. 15-24, 2020, 130. MPEG Meeting; Apr. 20, 2020-Apr. 24, 2020; Alpbach; (Motion Picture Expert Group or ISO/IEC JTC1/SC29/WG11), No. m53254; JVET-R0277, Apr. 4, 2020 (Apr. 4, 2020), 6 Pages, XP030286347, Retrieved from the Internet: URL: http://phenix.int-evry.fr/mpeg/doc_end_user/documents/130_Alpbach/wg11/m53254-JVEI-R0277-v1-JVET-R0277.zip JVET-R0277.docx [retrieved on Apr. 4, 2020].

Yu (Ericsson) R., et al., "AHG9: Three Restrictions when RPL is Present in PH," 18th Meeting; by Teleconference, Apr. 15-24, 2020, 130. MPEG Meeting; Apr. 20, 2020-Apr. 24, 2020; Alpbach; (Motion Picture Expert Group or ISO/IEC JTC1/SC29/WG11), No. m53230; JVET-R0253, 3 Pages, Apr. 3, 2020 (Apr. 3, 2020), XP030286294, Retrieved from the Internet: URL: http://phenix.int-evry.fr/mpeg/doc_end_user/documents/130_Alpbach/wg11/m53230-JVET-R0253-v1-JVET-R0253-v1.zip JVET-R0253.docx [retrieved on Apr. 3, 2020].

* cited by examiner

REFERENCE PICTURE LIST AND COLLOCATED PICTURE SIGNALING IN VIDEO CODING

This application claims the benefit of U.S. Provisional Patent Application 62/980,695, filed 24 Feb. 2020, the entire content of which is being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The techniques of this disclosure relate to inter prediction and, more particularly, to the signaling of reference pictures used in inter prediction. As discussed in more detail below, the reference picture list signaling used in VVC Draft 8 may have some inefficiencies and other potential problems. For instance, the signaling techniques of VVC Draft 8 allow for PH-level signaling indicating that a collocated picture for temporal motion vector prediction is to be derived from reference picture list 1, even though the PH may have associated P slices that only use reference picture list 0. According to the techniques of this disclosure, a video decoder may be configured to in response to the slice being a P slice, set a value for a syntax element associated with the slice to a value for the syntax element that indicates that the collocated picture used for temporal motion vector prediction is to be derived from the reference picture list 0. As described in more detail below, the video decoder may be configured to infer, without actually receiving an instance of the syntax element, the value that indicates that the collocated picture used for temporal motion vector prediction is to be derived from the reference picture list 0, thus effectively overriding the PH-level syntax for P slices. Thus, the techniques of this disclosure may advantageously enable a video decoder to parse and decode such a bitstream without unduly restricting the manner in which a video encoder may encode the bitstream.

According to one example of this disclosure, a method of decoding video data includes receiving a first syntax element; in response to the first syntax element indicating that reference picture list information is included in a picture header syntax structure, receiving a second syntax element in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; receiving a slice of the video data that refers to the picture header syntax structure; and in response to the slice being a P slice, setting a value for a third syntax element associated with the slice to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list.

According to another example of this disclosure, a device for decoding video data includes a memory configured to store video data; and one or more processors implemented in circuitry and configured to: receive a first syntax element; in response to the first syntax element indicating that reference picture list information is included in a picture header syntax structure, receive a second syntax element in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; receive a slice of the video data that refers to the picture header syntax structure; in response to the slice being a P slice, set a value for a third syntax element associated with the slice to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list.

According to another example of this disclosure, a computer-readable storage medium stores instructions that when executed by one or more processors cause the one or more processors to: receive a first syntax element; in response to the first syntax element indicating that reference picture list information is included in a picture header syntax structure, receive a second syntax element in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; receive a slice of the video data that refers to the picture header syntax structure; in response to the slice being a P slice, set a value for a third syntax element associated with the slice to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list.

According to another example of this disclosure, an apparatus for decoding video data includes means for receiving a first syntax element; means for receiving a second syntax element in a picture header syntax structure in response to the first syntax element indicating that reference picture list information is included in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; means for receiving a slice of the video data that refers to the picture header syntax structure; and means for setting a value for a third syntax element associated with the slice to a first value for the third syntax element in response to the slice being a P slice, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list.

According to another example of this disclosure, a method for encoding video data includes, in response to determining that reference picture list information is included in a picture header syntax structure, generating a first syntax element indicating that the reference picture list information is included in the picture header syntax structure; generating a second syntax element for inclusion in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; determining that a slice of the video data that refers to the picture header syntax structure is a P slice; in response to the slice being a P slice, determining that a value for a third syntax element associated with the slice is equal to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list; and outputting a bitstream of encoded video data that includes the first syntax element and the picture header syntax structure.

According to another example of this disclosure, a device for encoding video data includes a memory configured to store video data; and one or more processors implemented in circuitry and configured to: in response to determining that reference picture list information is included in a picture header syntax structure, generate a first syntax element indicating that the reference picture list information is included in the picture header syntax structure; generate a second syntax element for inclusion in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; determine that a slice of the video data that refers to the picture header syntax structure is a P slice; in response to the slice being a P slice, determine that a value for a third syntax element associated with the slice is equal to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list; and output a bitstream of encoded video data that includes the first syntax element and the picture header syntax structure.

According to another example of this disclosure, a computer-readable storage medium stores instructions that when executed by one or more processors cause the one or more processors to: in response to determining that reference picture list information is included in a picture header syntax structure, generate a first syntax element indicating that the reference picture list information is included in the picture header syntax structure; generate a second syntax element for inclusion in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; determine that a slice of the video data that refers to the picture header syntax structure is a P slice; in response to the slice being a P slice, determine that a value for a third syntax element associated with the slice is equal to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list; and output a bitstream of encoded video data that includes the first syntax element and the picture header syntax structure.

According to another example of this disclosure, an apparatus for encoding video data includes, means for generating a first syntax element indicating that reference picture list information is included in the picture header syntax structure in response to determining that reference picture list information is included in the picture header syntax structure; means for generating a second syntax element for inclusion in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; means for determining that a slice of the video data that refers to the picture header syntax structure is a P slice; means for determining that a value for a third syntax element associated with the slice is equal to a first value for the third syntax element in response to the slice being a P slice, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list; and means for outputting a bitstream of encoded video data that includes the first syntax element and the picture header syntax structure.

DETAILED DESCRIPTION

Figure 1:
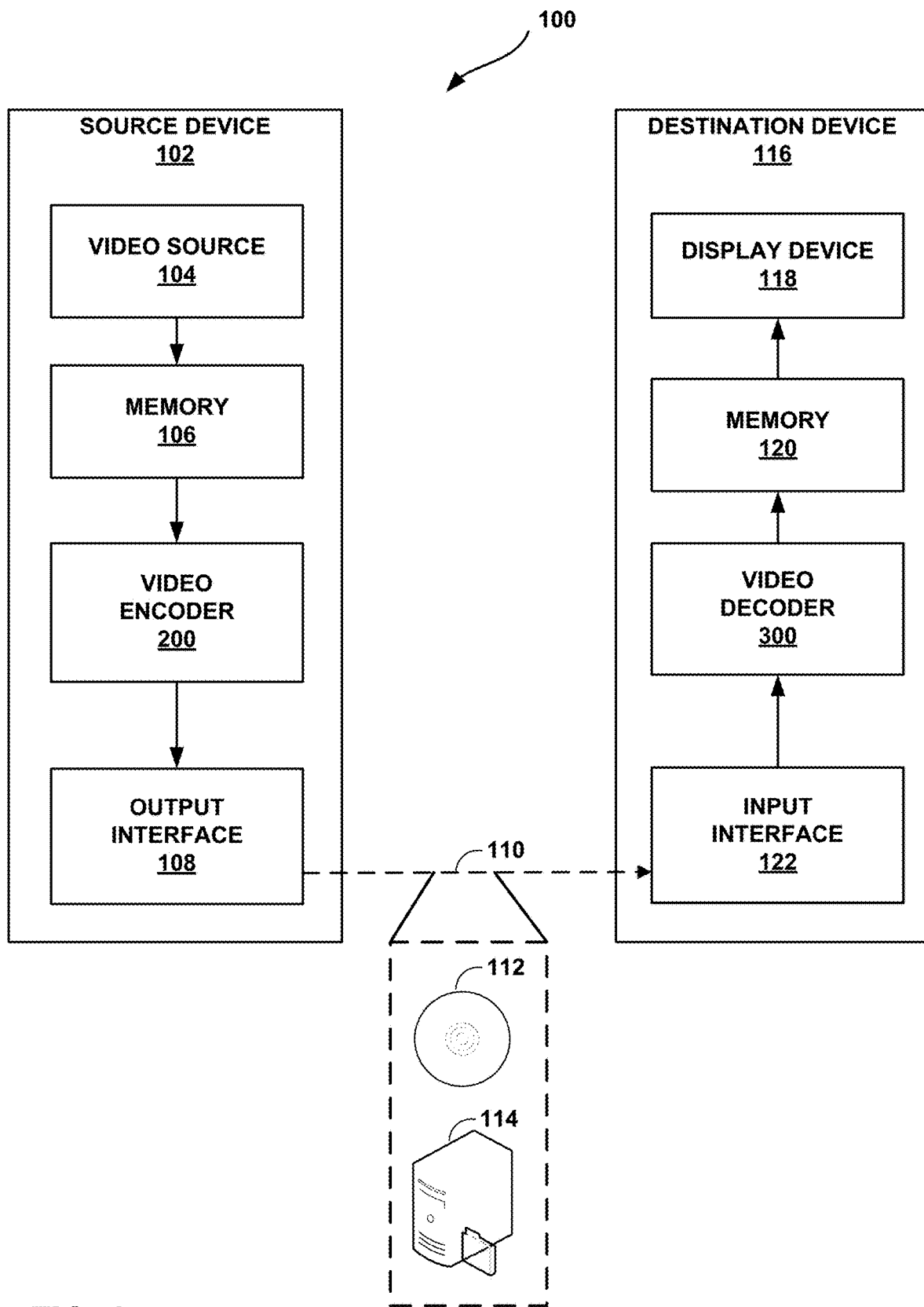
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

The techniques of this disclosure relate to inter prediction and, more particularly, to the signaling of reference pictures used in inter prediction. Inter prediction in ITU-T H.266, also referred to as Versatile Video Coding (VVC), utilizes reference picture lists, which generally refer to the list of reference pictures that is used for inter prediction of a P or B slice. Inter prediction in VVC utilizes two reference picture lists, with reference picture list 0 referring to the reference picture list used for inter prediction of a P or the first reference picture list used for inter prediction of a B slice, and reference picture list 1 referring to the second reference picture list used for inter prediction of a B slice. For the decoding process of a predictive (P) slice, only reference picture list 0 is used for inter prediction. For the decoding process of a bi-predictive (B) slice, both reference picture list 0 and reference picture list 1 are used for inter prediction. For decoding the slice data of an intra (I) slice, no reference picture list is used for for inter prediction.

A P slice is a slice that is decoded using intra prediction or using inter prediction with at most one motion vector and reference index to predict the sample values of each block. A B slice is a slice that is decoded using intra prediction or using inter prediction with at most two motion vectors and reference indices to predict the sample values of each block. An I slice is a slice that is decoded using intra prediction only.

Information for generating and maintaining reference picture lists is signalled in various syntax structures, including sequence parameter set (SPS) syntax structures, picture parameter set (PPS) syntax structures, picture header (PH) syntax structures, and slice header (SH) syntax structures. In VVC, an SPS refers to a syntax structure containing syntax elements that apply to zero or more entire coded layer video sequences (CLVSs) as determined by the content of a syntax element found in the PPS referred to by a syntax element found in each PH, and a PPS refers to a syntax structure containing syntax elements that apply to zero or more entire coded pictures as determined by a syntax element found in each PH. In VVC, a PH refers to a syntax structure containing syntax elements that apply to all slices of a coded picture, and a SH refers to a part of a coded slice containing the data elements pertaining to all tiles or coding tree unit (CTU) rows within a tile represented in the slice.

As discussed in more detail below, the reference picture list signaling used in VVC Draft 8 may have some inefficiencies and other potential problems. For instance, the signaling techniques of VVC Draft 8 allow for PH-level signaling indicating that a collocated picture for temporal motion vector prediction is to be derived from reference picture list 1, even though the PH may have associated P slices that only use reference picture list 0. According to the techniques of this disclosure, a video decoder may be configured to in response to the slice being a P slice, set a value for a syntax element associated with the slice to a value for the syntax element that indicates that the collocated picture used for temporal motion vector prediction is to be derived from the reference picture list 0. As described in more detail below, the video decoder may be configured to infer, without actually receiving an instance of the syntax element, the value that indicates that the collocated picture used for temporal motion vector prediction is to be derived from the reference picture list 0, thus effectively overriding the PH-level syntax for P slices. Thus, the techniques of this disclosure may advantageously enable a video decoder to parse and decode such a bitstream without unduly restricting the manner in which a video encoder may encode the bitstream.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for reference picture list and collocated picture signaling described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for reference picture list and collocated picture signaling described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as VVC. A recent draft of the VVC standard is described in Bross, et al. "Versatile Video Coding (Draft 8)," Joint Video Experts Team (WET) of ITU-T SG 16 WP 3 and ISO/IEC JTC 1/SC 29/WG 11, 17$^{th}$ Meeting: Brussels, BE, 7-17 Jan. 2020, WET-Q2001-v13 (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a PH, a block header, a SH, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
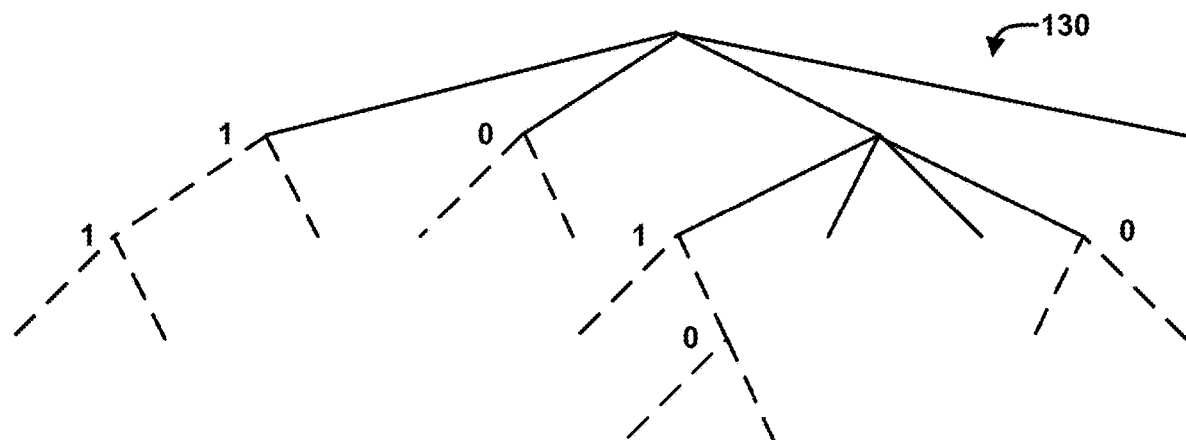
FIGS. 2A and 2B are conceptual diagrams illustrating an example quadtree binary tree (QTBT) structure, and a corresponding coding tree unit (CTU).
Figure 2B:
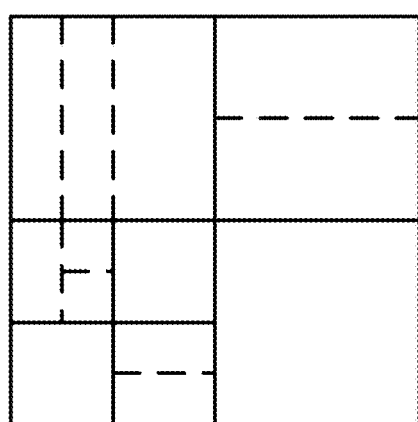

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (e.g., non-leaf) node of the binary tree, one flag is signaled to indicate which splitting type (e.g., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBT-Size) or the maximum allowed binary tree depth (MaxBT-Depth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. The binary tree node having a width equal to MinBTSize (4, in this example) implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

In VVC draft 8, a reference picture list (RPL) can be signaled in a PH or an SH. The enabling of temporal motion vector prediction (TMVP), however, is signaled only in a PH. A number of active reference pictures (the picture used for inter prediction) is signaled only in a SH.

An RPL is a list of reference pictures that is used for inter prediction of a P or B slice. Two reference picture lists, reference picture list 0 and reference picture list 1, are generated for each slice of a non-IDR picture. The set of unique pictures referred to by all entries in the two reference picture lists associated with a picture includes all reference pictures that may be used for inter prediction of the associated picture or any picture following the associated picture in decoding order. For the decoding process of a P slice, only reference picture list 0 is used for inter prediction. For the decoding process of a B slice, both reference picture list 0 and reference picture list 1 are used for inter prediction. For decoding the slice data of an I slice, no reference picture list is used for inter prediction. Reference picture list 0 is the reference picture list used for inter prediction of a P or the first reference picture list used for inter prediction of a B slice. Reference picture list 1 is the second reference picture list used for inter prediction of a B slice.

A PH is a syntax structure containing syntax elements that apply to all slices of a coded picture. An SH is a part of a coded slice containing the data elements pertaining to all tiles or CTU rows within a tile represented in the slice. A slice is an integer number of complete tiles or an integer number of consecutive complete CTU rows within a tile of a picture that are exclusively contained in a single NAL unit.

In VVC draft 8, the following syntax table is present:
rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure.

Picture Header

| | Descriptor |
|---|---|
| picture_header_structure( ) {<br>...<br>  if( rpl_info_in_ph_flag )<br>    ref_pic_lists( ) | |

|  | Descriptor |
|---|---|
| ... | |
|     if( ph_inter_slice_allowed_flag ) { | |
|         if( partition_constraints_override_flag ) { | |
|             ph_log2_diff_min_qt_min_cb_inter_slice | ue(v) |
|             ph_max_mtt_hierarchy_depth_inter_slice | ue(v) |
|             if( ph_max_mtt_hierarchy_depth_inter_slice != 0 ) { | |
|                 ph_log2_diff_max_bt_min_qt_inter_slice | ue(v) |
|                 ph_log2_diff_max_tt_min_qt_inter_slice | ue(v) |
|             } | |
|         } | |
|         if( cu_qp_delta_enabled_flag ) | |
|             ph_cu_qp_delta_subdiv_inter_slice | ue(v) |
|         if( pps_cu_chroma_qp_offset_list_enabled_flag ) | |
|             ph_cu_chroma_qp_offset_subdiv_inter_slice | ue(v) |
|         if( sps_temporal_mvp_enabled_flag ) { | |
|             ph_temporal_mvp_enabled_flag | u(1) |
|             if( ph_temporal_mvp_enabled_flag && rpl_info_in_ph_flag ) { | |
|                 ph_collocated_from_l0_flag | u(1) |
|                 if( ( ph_collocated_from_l0_flag && | |
|                   num_ref_entries[ 0 ][ PicRplsIdx[ 0 ] ] > 1 ) \|\| | |
|                   ( !ph_collocated_from_l0_flag && | |
|                   num_ref_entries[ 1 ][ PicRplsIdx[ 1 ] ] > 1 ) ) | |
|                 ph_collocated_ref_idx | ue(v) |
|             } | |
|         } | |
| ... | | ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0.

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.

ph_collocated_ref_idx specifies the reference index of the collocated picture used for temporal motion vector prediction.

When ph_collocated_from_l0_flag is equal to 1, ph_collocated_ref_idx refers to an entry in reference picture list 0, and the value of ph_collocated_ref_idx shall be in the range of 0 to num_ref_entries[0][PicRplsIdx[0]]−1, inclusive.

When ph_collocated_from_l0_flag is equal to 0, ph_collocated_ref_idx refers to an entry in reference picture list 1, and the value of ph_collocated_ref_idx shall be in the range of 0 to num_ref_entries[1][PicRplsIdx[1]]−1, inclusive.

When not present, the value of ph_collocated_ref_idx is inferred to be equal to 0.

Slice Header

|  | Descriptor |
|---|---|
| slice_header( ) { | |
|   ... | |
|     if( !rpl_info_in_ph_flag && ( ( nal_unit_type != IDR_W_RADL && nal_unit_type != | |
|         IDR_N_LP ) \|\| sps_idr_rpl_present_flag ) ) | |
|         ref_pic_lists( ) | |
|     if( ( rpl_info_in_ph_flag \|\| ( ( nal_unit_type != IDR_W_RADL && nal_unit_type != | |
|         IDR_N_LP ) \|\| sps_idr_rpl_present_flag ) ) && | |
|         ( slice_type != I && num_ref_entries[ 0 ][ RplsIdx[ 0 ] ] > 1 ) \|\| | |
|         ( slice_type == B && num_ref_entries[ 1 ][ RplsIdx[ 1 ] ] > 1 ) ) { | |
|         num_ref_idx_active_override_flag | u(1) |
|         if( num_ref_idx_active_override_flag ) | |
|             for( i = 0; i < ( slice_type == B ? 2: 1 ); i++ ) | |
|                 if( num_ref_entries[ i ][ RplsIdx[ i ] ] > 1 ) | |
|                     num_ref_idx_active_minus1[ i ] | ue(v) |
|     } | |
|     if( slice_type != I ) { | |
|         if( cabac_init_present_flag ) | |
|             cabac_init_flag | u(1) |

|  | Descriptor |
|---|---|
| `if( ph_temporal_mvp_enabled_flag && !rpl_info_in_ph_flag ) {`<br>    `if( slice_type = = B )`<br>        `slice_collocated_from_l0_flag` | u(1) |
|     `if( ( slice_collocated_from_l0_flag && NumRefIdxActive[ 0 ] > 1 ) | |`<br>        `( ! slice_collocated_from_l0_flag && NumRefIdxActive[ 1 ] > 1 )`<br>`)`<br>        `slice_collocated_ref_idx` | ue(v) |
|     `}`<br>    `if[ !wp_info_in_ph_flag && ( ( pps_weighted_pred_flag && slice_type`<br>`= = P ) | |`<br>        `( pps_weighted_bipred_flag && slice_type = = B ) ) )`<br>        `pred_weight_table( )`<br>    `}`<br>`...` |  | sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

num_ref_idx_active_override_flag equal to 1 specifies that the syntax element num_ref_idx_active_minus1 [0] is present for P and B slices and the syntax element num_ref_idx_active_minus1 [1] is present for B slices. num_ref_idx_active_override_flag equal to 0 specifies that the syntax elements num_ref_idx_active_minus1 [0] and num_ref_idx_active_minus1 [1] are not present. When not present, the value of num_ref_idx_active_override_flag is inferred to be equal to 1.

num_ref_idx_active_minus1[i] is used for the derivation of the variable NumRefIdxActive[i] as specified by Equation 143. The value of num_ref_idx_active_minus1 [i] shall be in the range of 0 to 14, inclusive.

For i equal to 0 or 1, when the current slice is a B slice, num_ref_idx_active_override_flag is equal to 1, and num_ref_idx_active_minus1 [i] is not present, num_ref_idx_active_minus1 [i] is inferred to be equal to 0.

When the current slice is a P slice, num_ref_idx_active_override_flag is equal to 1, and num_ref_idx_active_minus1 [0] is not present, num_ref_idx_active_minus1 [0] is inferred to be equal to 0.

slice_collocated_from_l0_flag equal to 1 specifies that the collocated picture use for temporal motion vector prediction is derived from reference picture list 0. slice_collocated_from_l0_flag equal to 0 specifies that the collocated picture used for temporal motion vector prediction is derived from reference picture list 1.

When slice_type is equal to B or P, ph_temporal_mvp_enabled_flag is equal to 1, and slice_collocated_from_l0_flag is not present, the following applies:
 If rpl_info_in_ph_flag is equal to 1, slice_collocated_from_l0_flag is inferred to be equal to ph_collocated_from_l0_flag.
 Otherwise (rpl_info_in_ph_flag is equal to 0 and if slice_type is equal to P, the value of slice_collocated_from_l0_flag is inferred to be equal to 1.

slice_collocated_ref_idx specifies the reference index of the collocated picture used for temporal motion vector prediction.

When slice_type is equal to P or when slice_type is equal to B and collocated_from_l0_flag is equal to 1, slice_collocated_ref_idx refers to an entry in reference picture list 0, and the value of slice_collocated_ref_idx shall be in the range of 0 to NumRefIdxActive[0]−1, inclusive.

When slice_type is equal to B and slice_collocated_from_l0_flag is equal to 0, slice_collocated_ref_idx refers to an entry in reference picture list 1, and the value of slice_collocated_ref_idx shall be in the range of 0 to NumRefIdxActive[1]−1, inclusive.

When slice_collocated_ref_idx is not present, the following applies:
 If rpl_info_in_ph_flag is equal to 1, the value of slice_collocated_ref_idx is inferred to be equal to ph_collocated_ref_idx.
 Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture.

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag? 0:1] [slice_collocated_ref_idx] shall be equal to 0.

The above implementation of PH and SH semantics may have some potential problems. As mentioned earlier, a TMVP enable flag is signaled only in a PH regardless of whether an RPL is signaled in the PH or SH. Also, VVC draft 8 imposes a constraint where bitstream conformance requires that the picture referred to by slice_collocated_ref_idx shall be the same for all slices of a coded picture.

In the case when an RPL is signaled in a PH and TMVP is enabled, then the number of active reference pictures in a slice of the picture may be smaller than the number of reference pictures included in the RPL in the PH, and the collocated picture may not be included into the active reference pictures.

In another example of a potential problem, for some coding scenarios, TMVP may be enabled in a PH, but RPLs may be signaled per slice. The number of active reference pictures may vary from slice to slice of the same picture, and a collocated picture may not be included in the RPLs for some slices. This disclosure describes techniques for disabling TMVP for the slices that violate collocated picture constraints.

There may be an inefficiency in RPL signaling in a SH. Current implementations (e.g., VVC draft 8) permit an RPL to be signaled for I-slices even when an RPL is not present for IDR pictures, such as when sps_idr_rpl_present_flag is equal to 0. There may also be inefficiency in weighted prediction signaling in a PH, which may be signaled when inter related syntax is not present, such as when ph_inter_slice_allowed_flag is equal to 0 and an RPL is not present for IDR pictures, such as when sps_idr_rpl_present_flag is equal to 0. This disclosure describes techniques that potentially address the aforementioned problems. The various techniques described below may be used either independently or in any combination.

In some examples, to address the redundant signaling of RPLs in PHs, this disclosure describes techniques for signaling an RPL when inter prediction is allowed, such as when ph_inter_slice_allowed_flag is equal to 1, or when an RPL is present for an IDR picture, such as when sps_idr_rpl_present_flag is equal to 1.

In one example, this technique may be implemented with the following syntax changes relative to VVC draft 8. In the examples below and throughout the rest of this disclosure, text in between <ADD> and </ADD> represents text being added to VVC draft 8, and text in between <DEL> and </DEL> represents text being removed, i.e., deleted, from VVC draft 8.

```
if( rpl_info_in_ph_flag <ADD> &&
    ( ph_inter_slice_allowed_flag | |
    ( ph_intra_slice_allowed_flag &&
    sps_idr_rpl_present_flag ) ) </ADD> )
        ref_pic_lists( )
```

Video decoder 300 may be configured to infer that when ph_intra_slice_allowed_flag is not present that a value for ph_intra_slice_allowed_flag is inferred to be equal to 1, meaning that when inter prediction is not allowed then intra prediction shall be allowed. Thus, the above condition may be simplified as follows:

```
if( rpl_info_in_ph_flag <ADD> &&
    ( ph_inter_slice_allowed_flag | |
    sps_idr_rpl_present_flag ) </ADD> )
        ref_pic_lists( )
```

Also, video encoder 200 may be configured to signal a weighted prediction table when inter prediction is allowed, for example when ph_inter_slice_allowed_flag is equal to 1, or when RPL is present for IDR picture, such as when sps_idr_rpl_present_flag is equal to 1.

An example implementation of these techniques is shown below as changes relative to VVC draft 8:

```
if( ( pps_weighted_pred_flag | |
    pps_weighted_bipred_flag ) &&
    wp_info_in_ph_flag <ADD>
    && ( ph_inter_slice_allowed_flag
    | | ( ph_intra_slice_allowed_flag &&
    sps_idr_rpl_present_flag ) ) </ADD>)
        pred_weight_table( )
```

Video decoder 300 may be configured to infer that when ph_intra_slice_allowed_flag is not present that a value for ph_intra_slice_allowed_flag is to be equal to 1, meaning that when inter prediction is not allowed then intra prediction shall be allowed. Thus, the above condition may be simplified as follows:

```
if( ( pps_weighted_pred_flag | |
    pps_weighted_bipred_flag) &&
    wp_info_in_ph_flag <ADD>
    && ( ph_inter_slice_allowed_flag
    | | sps_idr_rpl_present_flag ) </ADD> )
        pred_weight_table( )
```

The two techniques above use similar conditions and can be combined to signal ref_pic_lists( ) and pred_weight_table( ), which may be advantageous as the result of implementing such conditions requires fewer conditional checks.

An example implementation of these techniques is shown below as changes relative to VVC draft 8:

```
if( rpl_info_in_ph_flag <ADD>&& ( ph_inter_slice_allowed_flag | |
    ( ph_intra_slice_allowed_flag && sps_idr_rpl_present_flag ) ) </ADD>) {
        ref_pic_lists( )
        <ADD>if( ( pps_weighted_pred_flag | | pps_weighted_bipred_flag ) &&
wp_info_in_ph_flag)
            pred_weight_table( ) </ADD>
}
```

In another example, in view of the inference described above for ph_intra_slice_allowed_flag, these techniques may be implemented as shown below relative to VVC draft 8:

```
if( rpl_info_in_ph_flag <ADD>&& ( ph_inter_slice_allowed_flag | |
sps_idr_rpl_present_flag ) </ADD> ) {
        ref_pic_lists( )
        <ADD>if( ( pps_weighted_pred_flag | | pps_weighted_bipred_flag ) &&
wp_info_in_ph_flag )
            pred_weight_table( ) </ADD>
}
``` pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0.
pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

According to techniques of this disclosure, to avoid any inconsistency between the active entries across slices of the same picture, video encoder 200 may be configured to signal the number of active reference picture entries in a PH. In one example, video encoder 200 may signal the number of active reference entries under the condition of RPL presence in the PH, for example rpl_info_in_ph_flag is equal to 1, and inter prediction is allowed, for example when ph_inter_slice_allowed_flag being equal to 1, e.g. there may be P- or B-slices present in a picture, or when an RPL is present for an IDR picture, for example when sps_idr_rpl_present_flag is equal to 1.

An example implementation of these techniques is shown below as changes relative to VVC draft 8:

<ADD>ph_num_ref_idx_active_override_flag equal to 1 specifies that the syntax element ph_num_ref_idx_active_minus1 [0] is present in PH and the syntax element ph_num_ref_idx_active_minus1 [1] is present when rpl1_present_flag is equal to 1. ph_num_ref_idx_active_override_flag equal to 0 specifies that the syntax elements ph_num_ref_idx_active_minus1[0] and ph_num_ref_idx_active_minus1[1] are not present. When not present, the value of ph_num_ref_idx_active_override_flag is inferred to be equal to 0. </ADD>
<ADD>ph_num_ref_idx_active_minus1[i] is used for the derivation of the variable NumRefIdxActive[i] as specified by Equation 143. The value of ph_num_ref_idx_active_minus1[i] shall be in the range of 0 to num_ref_entries[i][RplsIdx[i]], inclusive. When ph_num_ref_idx_active_minus1[i] is not present, it is inferred to be equal to 0. </ADD>

Additionally, video encoder 200 may be configured to conditionally signal, and video decoder 300 configured to conditionally parse, an override flag num_ref_idx_active_override_flag in a SH based on an override flag ph_num_ref_idx_active_override_flag value in a PH. In one example, video encoder 200 may be configured to only signal a SH override flag num_ref_idx_active_override_flag when a PH override flag ph_num_ref_idx_active_override_flag is equal to 0.

```
<ADD>if( rpl_info_in_ph_flag && ( ph_inter_slice_allowed_flag ||
( ph_intra_slice_allowed_flag && sps_idr_rpl_present_flag ) ) ) {
        ph_num_ref_idx_active_override_flag                              u(1)
        if( ph_num_ref_idx_active_override_flag ) {
           for( i = 0; i < rpl1_present_flag + 1; i++ )
              if( num_ref_entries_[ i ][ RplsIdx[ i ] ] > 1 )
                 ph_num_ref_idx_active_minus1[ i ]                       ue(v)
        }
    }                                                                    </ADD>
```

Video decoder 300 may be configured to infer that when ph_intra_slice_allowed_flag is not present that a value for ph_intra_slice_allowed_flag is to be equal to 1, meaning that when inter prediction is not allowed that intra prediction shall be allowed. Thus, the above condition can be simplified as follows:

Video decoder 300 may be configured to derive the number of active reference pictures NumRefIdxActive[i] in a slice from the number of active reference pictures signaled in PH if an override flag in a PH ph_num_ref_idx_active_override_flag is equal to 1, which is applied for RefPicList0 and RefPicList1, respectively.

```
<ADD>if( rpl_info_in_ph_flag && ( ph_inter_slice_allowed_flag ||
sps_idr_rpl_present_flag ) ) {
        ph_num_ref_idx_active_override_flag                              u(1)
        if( ph_num_ref_idx_active_override_flag ) {
           for( i = 0; i < rpl1_present_flag + 1; i++ )
              if( num_ref_entries[ i ][ RplsIdx[ i ] ] > 1 )
                 ph_num_ref_idx_active_minus1[ i ]                       ue(v)
        }
    }                                                                    </ADD>
```

An example implementation of these techniques is shown below as changes relative to VVC draft 8:

The variable NumRefIdxActive[i] is derived as follows:

```
        for( i = 0; i < 2; i++ ) {
    if( slice_type = = B | | ( slice_type = = P && i = = 0 ) ) {
                <ADD>if( ph_num_ref_idx_active_override_flag )
            NumRefIdxActive[ i ] = ph_num_ref_idx_active_minus1[ i ] + 1
        else</ADD> if( num_ref_idx_active_override_flag )
            NumRefIdxActive[ i ] = num_ref_idx_active_minus1[ i ] + 1      (143)
        else {
            if( num_ref_entries[ i ][ RplsIdx[ i ] ] >=
num_ref_idx_default_active_minus1[ i ] + 1 )
                NumRefIdxActive[ i ] =
num_ref_idx_default_active_minus1[ i ] + 1
            else
                NumRefIdxActive[ i ] = num_ref_entries[ i ][ RplsIdx[ i ] ]
        }
    } else /* slice_type = = I | | ( slice_type = = P && i = = 1 ) */
        NumRefIdxActive[ i ] = 0
}
```

In the weighted prediction table signaling, there are two syntax elements num_l0_weights and num_l1_weights, which indicate the number of weights signaled in RefPicList0 and RefPicList1. When an override flag is signaled in a PH, the number of entries in an RPL is known. Therefore, the value of num_l0_weights and/or num_l1_weights may not be needed. Video encoder 200 may be configured to conditionally signal those syntax elements based on the presence of a PH override flag ph_num_ref_idx_active_override_flag, and video decoder 300 may be configured to infer that the number of weights is to be equal to ph_num_ref_idx_active_minus1 for RefPicList0 and RefPicList1, respectively.

An example implementation of these techniques is shown below as changes relative to VVC draft 8:

```
    if( wp_info_in_ph_flag <ADD>&&
    !ph_num_ref_idx_active_override_flag</ADD> )
        num_l0_weights                              ue(v)
    if( wp_info_in_ph_flag <ADD> &&
    !ph_num_ref_idx_active_override_flag</ADD> )
        num_l1_weights                              ue(v)
``` num_l0_weights specifies the number of weights signalled for entries in reference picture list. The value of num_l0_weights shall be in the range of 0 to num_ref_entries[0][PicRplsIdx[0]], inclusive.

<ADD>The variable NumWeightsL0 is derived as follows:

```
    if( wp_info_in_ph_flag &&
    !ph_num_ref_idx_active_override_flag )
        NumWeightsL0 = num_l0_weights
    else if( wp_info_in_ph_flag )
        NumWeightsL0 =
        ph_num_ref_idx_active_minus1[ 0 ] + 1
    else
        NumWeightsL0 = NumRefIdxActive[ 0 ] </ADD>
``` num_l1_weights specifies the number of weights signalled for entries in reference picture list 1. The value of num_l1_weights shall be in the range of 0 to num_ref_entries[1][PicRplsIdx[1]], inclusive.

<ADD>The variable NumWeightsL0 is derived as follows:

```
    if( wp_info_in_ph_flag &&
    !ph_num_ref_idx_active_override_flag )
        NumWeightsL1 = num_l1_weights
    else if( wp_info_in_ph_flag )
        NumWeightsL1 =
        ph_num_ref_idx_active_minus1[ 1 ] + 1
    else
        NumWeightsL0 = NumRefIdxActive[ 0 ] </ADD>
```

According to techniques of this disclosure, to address the problem where a collocated picture may not be present in the RPL when TMVP is enabled, video encoder 200 and video decoder 300 may be configured to operate according to a constraint that a collocated picture shall be present among active reference pictures.

In one example, the ph_collocated_ref_idx constraint is modified in a way that the range of the ph_collocated_ref_idx is from 0 to the smallest number of active reference pictures of any slice belonging to the same picture. In this case, it may not be possible to signal a collocated reference index in a PH to indicate a collocated picture which may not be present in some slices of the same picture.

In one example, this constraint may be implemented by modifying the semantic constraints of ph_collocated_ref_idx as follows:

When ph_collocated_from_l0_flag is equal to 1, ph_collocated_ref_idx refers to an entry in reference picture list 0, and the value of ph_collocated_ref_idx shall be in the range of 0<ADD>to the smallest value of NumRefIdxActive[0]−1 of all slices in a picture, inclusive</ADD>.

When ph_collocated_from_l0_flag is equal to 0, ph_collocated_ref_idx refers to an entry in reference picture list 1, and the value of ph_collocated_ref_idx shall be in the range of 0<ADD>to the smallest value of NumRefIdxActive[1]−1 of all slices in a picture, inclusive</ADD>.

In some examples, the semantics of ph_collocated_ref_idx may be kept unchanged as those semantics may be used during the parsing of ph_collocated_ref_idx, but the bitstream conformance constraints may be added to reflect that ph_collocated_ref_idx shall not exceed the value of num_ref_idx_active_minus1[0][PicRplsIdx[0]]−1 or num_ref_idx_active_minus1[1][PicRplsIdx[1]]−1 of any slice in the picture.

In one example, the bitstream conformance constraint can be expressed as follows:
It is a requirement of bitstream conformance that the following conditions are true:
  When ph_collocated_from_l0_flag is equal to 1, ph_collocated_ref_idx refers to an entry in reference picture list 0, and the value of ph_collocated_ref_idx shall be in the range of 0 to <ADD>the smallest value of NumRefIdxActive[0]−1 of all slices in a picture</ADD>, inclusive.
  When ph_collocated_from_l0_flag is equal to 0, ph_collocated_ref_idx refers to an entry in reference picture list 1, and the value of ph_collocated_ref_idx shall be in the range of 0 to <ADD>the smallest value of NumRefIdxActive[1]−1 of all slices in a picture</ADD>, inclusive.

Thus, in some examples, video encoder 200 and video decoder 300 may operate according to the constraint for NumRefIdxActive of a slice included into the picture, that if TMVP is enabled the number of active reference pictures NumRefIdxActive shall be in a range of ph_collocated_ref_idx to num_ref_idx_active_minus1 for a reference picture list.

In one example, the constraint may be expressed as follows:
  <ADD>When ph_temporal_mvp_enabled_flag is equal to 1, NumRefIdxActive[slice_collocated_from_l0_flag? 0:1] shall be greater or equal to slice_collocated_ref_idx. </ADD>

In yet another example, a constraint may be added to require a collocated picture be an active reference picture, i.e., the collocated picture must be present in the RPL.

In one example, the constraint may be expressed as follows:
  <ADD>A collocated picture of a slice shall be an active entry. </ADD>

Optionally, a check whether TMVP is enabled may be added to the constraint, in one example as follows:
  <ADD>A collocated picture of a slice if TMVP is enabled shall be an active entry. </ADD>

In VVC draft 8, a reference picture list from which collocated picture is derived can be signaled in a PH using ph_collocated_from_l0_flag. There may be a problem when this flag ph_collocated_from_l0_flag is equal to 0, i.e. collocated picture is derived from RefPicList1 and there are P and B slices present in the picture. In such a case, a collocated picture cannot be derived for a P slice because there is no RefPicList1 available for P slices.

To address this problem, video encoder 200 and video decoder 300 may be configured to operate according to a constraint that ph_collocated_from_l0_flag shall not be equal to 1 when there is a P slice in a picture. In one example, the constraint can be expressed as follows:
ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.

<ADD>When ph_temporal_mvp_enabled_flag is equal to 1, the value of ph_collocated_from_l0_flag shall be equal to 1 if there is at least one P slice in a picture. </ADD>

Thus, video encoder 200 and video decoder 300 may be configured to operate a according to a constraints that when a slice type is P and TMVP is enabled, then ph_collocated_from_l0_flag shall be equal to 1. In one example, the constraint can be expressed as follows:
slice_type specifies the coding type of the slice according to Table 9.

TABLE 9

Name association to slice type

| slice_type | Name of slice_type |
|---|---|
| 0 | B (B slice) |
| 1 | P (P slice) |
| 2 | I (I slice) |

<ADD>When slice_type is equal to 1, the value of slice_collocated_from_l0_flag shall be equal to 1. </ADD>

In some examples, when slice_collocated_from_l0_flag is not signaled due to the ph_collocated_from_l0_flag signaling in a PH, video decoder 300 may be configured to infer that the slice_collocated_from_l0_flag is equal to 1 for P slices. In one example, the constraint can be expressed as follows:
slice_collocated_from_l0_flag equal to 1 specifies that the collocated picture used for temporal motion vector prediction is derived from reference picture list 0. slice_collocated_from_l0_flag equal to 0 specifies that the collocated picture used for temporal motion vector prediction is derived from reference picture list 1.

When slice_type is equal to B or P, ph_temporal_mvp_enabled_flag is equal to 1, and slice_collocated_from_l0_flag is not present, the following applies:
  <ADD>
  If slice_type is equal to P, the value of slice_collocated_from_l0_flag is inferred to be equal to 1.
  Otherwise, if rpl_info_in_ph_flag is equal to 1, slice_collocated_from_l0_flag is inferred to be equal to ph_collocated_from_l0_flag.
  </ADD>

That is, for a P slice, video decoder 300 may be configured to set slice_collocated_from_l0_flag equal to 1, meaning prediction from l0, regardless of whether the value of ph_collocated_from_l0_flag is 0 or 1.

To address the problem of not having collocated picture in the RPL, the techniques of this disclosure include disabling the TMPV usage if a collocated picture is not present in the RPL but TMVP is enabled. In one example, video encoder 200 may be configured to signal a TMVP enable flag in a SH in addition to the TMVP enable flag in a PH. This allows the disabling of TMVP on a slice by slice basis, in one example, for the slices that violate collocated picture constraints if TMVP is enabled in a PH. In another example, video encoder 200 and video decoder 300 may be configured to not apply TMVP on a block basis if collocated picture is not present in the RPL even TMVP is enabled.

Video encoder 200 may be configured to conditionally signal a TMVP enable flag in a slice based on the TMVP enable flag in the PH. In one example, video encoder 200 may signal a TMVP enable flag in a slice if the TMVP enable flag in the PH is equal to 1. When the TMVP enable flag is not present SH, video decoder 300 may be configured to infer the value of the TMVP to be equal to the TMVP flag signaled in the PH.

In one example, the above techniques may be implemented as follows:

```
if( ph_temporal_mvp_enabled_flag )
    <ADD>slice_temporal_mvp_enabled_flag           u(1)
                                                   </ADD>
```

<ADD>slice_temporal_mvp_enabled_flag equal to 1 specifies that temporal motion vector predictors can be used for inter prediction. slice_temporal_mvp_enabled_flag is equal to 0 specifies that temporal motion vector predictors is disabled in a slice. When slice_temporal_mvp_enabled_flag is not present, it is inferred to be equal to ph_temporal_mvp_enabled_flag. </ADD>

In another example, the TMVP enable flag may be moved from PH to SH. If TMVP is disabled on a slice level, then video encoder 200 may be configured to not signal TMVP related information, such a slice_collocated_from_l0_flag and slice_collocated_ref_idx.

An example implementation of these techniques is shown below as changes relative to VVC draft 8:

```
if( ph_temporal_mvp_enabled_flag && !rpl_info_in_ph_flag ) {
    <ADD> slice_temporal_mvp_enabled_flag                                        u(1)
        if( slice_temporal_mvp_enabled_flag ) {                                  </ADD>
            if( slice_type = = B )
                slice_collocated_from_l0_flag                                    u(1)
            if( ( slice_collocated_from_l0_flag && NumRefIdxActive[ 0 ] > 1 )
||
                ( ! slice_collocated_from_l0_flag && NumRefIdxActive[ 1 ] > 1
) )
                slice_collocated_ref_idx                                         ue(v)
    }
```

In another example, video encoder 200 may be configured to always signal a TMVP enable flag with an RPL, by for example always signaling a TMVP enable flag in a SH if an RPL is signaled in SH, and signal TMVP enable flag in a PH if an RPL is signaled in PH.

Additionally, video encoder 200 may be configured to signal the TMVP enable flag in a SH or a PH in a mutually exclusive manner, such that the TMVP enable flag cannot be signaled in both PH and SH.

When a collocated picture is indicated in a PH, for example by a ph_collocated_ref_idx, it is possible to indicate a collocated picture having a picture size different from the current picture size. To address this problem, this disclosure describes techniques for configuring video encoder 200 and video decoder 300 to operate according to a constraint that a collocated picture indicated in a PH shall have the same picture size as the current picture and no scaling of the collocated picture is applied or no different values of the scaling windows, which are used to derive the scaling ratio, of the reference collocated picture and the current picture are used.

In one example, the above techniques may be implemented as follows:
<ADD>It is a requirement of bitstream conformance that the values of pic_width_in_luma_samples and pic_height_in_luma_samples of the reference picture referred to by ph_collocated_ref_idx shall be equal to the values of pic_width_in_luma_samples and pic_height_in_luma_samples, respectively, of the current picture, and RprConstraintsActive[ph_collocated_from_l0_flag? 0:1][ph_collocated_ref_idx] shall be equal to 0. </ADD>

In VVC draft 8, an RPL can be signaled in an SPS, PH or SH. When signaled in a PH or SH, the RPL can be derived from the SPS. In the latter case, a flag rpl_sps_flag[i] is signaled to indicate that the RPL is derived from the SPS, and an RPL index is signaled rpl_idx[i] to indicate which RPL of SPS is to be used.

There can be two lists, RefPicList0 and RefPicList1, which utilize such RPL derivation. In the case of RefPicList1, an additional syntax element flag rpl1_idx_present_flag is signaled to indicate whether the RPL derivation from the SPS happens. If the RPL is not derived from SPS, then the RPL is explicitly signaled, which potentially introduces inconsistency into the design by having RefPicList0 and RefPicList1 signaling being treated in different manners.

In one example, video encoder 200 and video decoder 300 may code an rpl0_idx_present_flag, which indicates the presence of rpl_sps_flag[i] and rpl_idx[i] for RefPicList0, i.e. to provide the same signaling functionality as for RefPicList1.

In another example, rpl1_idx_present_flag may be replaced with another flag rpl1_present_flag, which indicates whether any RefPicList1 related syntax elements are present. In such case, this flag may be additionally used as B-slice presence in a picture.

In one example, such a flag may be signaled in PPS and implemented as follows:
<ADD>rpl1_present_flag equal to 0 specifies that RefPicList1 realted syntax elements are not present in the PH syntax structures or the slice headers for pictures referring to the PPS. rpl1_present_flag equal to 1 specifies that RefPicList1 realted syntax elements may be present in the PH syntax structures or the slice headers for pictures referring to the PPS. </ADD>
Then, video encoder 200 may be configured to conditionally signal, and video decoder 300 configured to conditionally parse, the RefPicList1 syntax elements based on this flag.

In one example, video encoder 200 may be configured to conditionally signal a collocated picture flag from RefPicList0 in a PH based on this flag, and if not present, then video decoder 300 may be configured to infer that the collocated picture flag indicates that a collocated picture is from RefPicList0. An example implementation of these techniques is shown below as changes relative to VVC draft 8:

| | |
|---|---|
| <ADD> if( rpl1_present_flag ) </ADD><br>    ph_collocated_from_l0_flag | u(1) | ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1. <ADD>When not present, ph_collocated_from_l0_flag is inferred be equal of 1. </ADD>

In another example, video encoder 200 may be configured to conditionally signal a zero MVD flag for RefPicList1 in a PH based on ph_collocated_from_l0_flag. An example implementation of these techniques is shown below as changes relative to VVC draft 8:

| | |
|---|---|
| <ADD>if( rpl1_present_flag) </ADD><br>    mvd_l1_zero_flag | u(1) |

In another example, video encoder 200 and video decoder 300 may be configured to operate according to a constraint where slice type is constrained that when rpl1_present_flag is equal to 0, slice may have only I-slice or P-slice types. For example, it may be expressed as follows:
<ADD>When rpl1_present_flag is equal to 0 the value of slice_type shall be equal to 1 or 2. </ADD>

In another example, video encoder 200 may be configured to conditionally signal, and video decoder 300 conditionally parse, a weighted prediction table for RefPicList1 based on rpl1_present_flag.

An example implementation of these techniques is shown below as changes relative to VVC draft 8:

| | |
|---|---|
| if( wp_info_in_ph_flag<br>    && <ADD>rpl1_present_flag </ADD>)<br>    num_l1_weights | ue(v) | num_l1_weights specifies the number of weights signalled for entries in reference picture list 1. The value of num_l1_weights shall be in the range of 0 to num_ref_entries[1][PicRplsIdx[1]], inclusive.

The variable NumWeightsL0 is derived as follows:

| |
|---|
| if( wp_info_in_ph_flag && <ADD>&& rpl1_present_flag </ADD>)<br>    NumWeightsL1 = num_l1_weights<br>else<br>    NumWeightsL0 = NumRefIdxActive[ 0 ] |

In another example, video encoder 200 may be configured to conditionally signal RPL syntax elements for RefPicList1 based on rpl1_present_flag. An example implementation of these techniques is shown below as changes relative to VVC draft 8:

| | Descriptor |
|---|---|
| ref_pic_lists( ) {<br>    for( i = 0; i < <ADD>rpl1_present_flag ? 2 : 1</ADD>; i++ ) {<br>        if( num_ref_pic_lists_in_sps[ i ] > 0 &&<br>                <DEL> ( i == 0 \|\| ( i == 1 && rpl1_idx_present_flag ) )<br></DEL> )<br>            rpl_sps_flag[ i ] | u(1) |
|         if( rpl_sps_flag[ i ] ) {<br>            if( num_ref_pic_lists_in_sps[ i ] > 1 &&<br>                    <DEL> ( i == 0 \|\| ( i == 1 && rpl1_idx_present_flag ) )<br></DEL>)<br>                rpl_idx[ i ] | u(v) |
|         } else<br>            ref_pic_list_struct( i, num_ref_pic lists_in_sps[ i ] )<br>        for( j = 0; j < NumLtrpEntries[ i ][ RplsIdx[ i ] ]; j++ ) {<br>            if( ltrp_in_slice_header_flag[ i ][ RplsIdx[ i ] ] )<br>                poc_lsb_lt[ i ][ j ] | u(v) |
|            delta_poc_msb_present_flag[ i ][ j ] | u(1) |
|            if( delta_poc_msb_present_flag[ i ][ j ] )<br>                delta_poc_msb_cycle_lt[ i ][ j ] | ue(v) |
|         }<br>    }<br>} | |

In this case the condition checks in ref_pic_list signaling may be simplified.

In VVC draft 8, an RPL can be signaled for an I-slice of a non-IDR picture. However, such RPL is not used in I-slice decoding, and there is no way to avoid this redundant signaling. This disclosure describes techniques for configuring video encoder 200 to condition RPL signaling on a slice not being an I-slice type. This disclosure also describes techniques for configuring video encoder 200 signal an RPL for IDR pictures only when indicated that an RPL is present for such pictures, for example when sps_idr_rpl_present_flag is equal to 1.

An example implementation of these techniques is shown below as changes relative to VVC draft 8:

| |
|---|
| if( !rpl_info_in_ph_flag <ADD> && ( ( nal_unit_type ==<br>IDR_W_RADL \|\| nal_unit_type == IDR_N_LP ) &&<br>sps_idr_rpl_present_flag ) \|\| slice_type != I ) </ADD><br>    ref_pic_lists( ) |

In VVC draft 8, a reference picture override flag num_ref_idx_active_override_flag is signaled in the SH only when RPL is signaled in the PH. This potentially creates a problem when an RPL is signaled in the SH and some pictures should be signaled in RPL to be available for future reference, but the number of active reference picture cannot be changed because the override flag is not signaled in the SH. The only way to signal such pictures is to make the whole signaled RPL to be active, which requires extra overhead in reference index signaling per block, due to some picture included in the RPL not being used. Another problem is that num_ref_idx_active_override_flag is signaled for I-slices even when not needed.

According to techniques of this disclosure, video encoder 200 may be configured to signal an override flag num_ref_idx_active_override_flag in an SH even when an RPL is signaled in the SH. Additionally or alternatively, video encoder 200 may be configured to not signal (e.g., refrain from signaling) an override flag for I-slices of an IDR picture even when other signaling indicates that an RPL is present for such pictures. For example, when sps_idr_rpl_present_flag is equal to 1, as an RPL is not needed for I-slice decoding, there is no reference index signaling in I-slices, so there is not extra overhead.

An example implementation of these techniques is shown below as changes relative to VVC draft 8:

```
   if( (<DEL> rpl_info_in_ph_flag | | ( ( nal_unit_type != IDR_W_RADL
&& nal_unit_type !=
         IDR_N_LP ) | | sps_idr_rpl_present_flag ) ) &&</DEL>
         ( slice_type != I && num_ref_entries[ 0 ][ RplsIdx[ 0 ] ] > 1 ) | |
         ( slice_type = = B && num_ref_entries[ 1 ][ RplsIdx[ 1 ] ] > 1 ) ) {
      num_ref_idx_active_override_flag                                              u(1)
```

In this example implementation, if the signaling indicates that RPL information is present for I-slices, when RPL information is signaled in a PH (e.g., when rpl_info_in_ph_flag is equal to 1) or RPL is present for IDR picture (e.g., sps_idr_rpl_present_flag is equal to 1), and the number of RPL entries is more than 1 in any reference picture list, the syntax element num_ref_idx_active_override_flag is not signaled. Or, in other words, if the signaling indicates that RPL is present in PH (rpl_info_in_ph_flag is equal to 1) or RPL is present for IDR picture (sps_idr_rpl_present_flag is equal to 1), and the number of RPL entries is more than 1 in any reference picture list, the num_ref_idx_active_override_flag is only signaled for P- or B-slice types.

In VVC draft 8, there is a flag gdr_or_irap_pic_flag in PH to indicate whether a picture is IRAP or GDR, which may be used to identify the starting point for decoding. However, the signaling of this flag is not constrained on the indication that there can be mixed NAL types in a picture. In such cases, it is not possible to have IRAP or GDR pictures.

According to techniques of this disclosure, video encoder 200 may be configured to conditionally signal gdr_or_irap_pic_flag based on an indication of the mixed NAL unit types mixed_nalu_types_in_pic_flag. Video decoder 300 may be configured to infer gdr_or_irap_pic_flag is equal to 0 when gdr_or_irap_pic_flag is not present in the bitstream.

An example implementation of these techniques is shown below as changes relative to VVC draft 8:

```
    <ADD> if( mixed_nalu_types_in_pic_flag ) </ADD>
       gdr_or_irap_pic_flag                       u(1)
``` gdr_or_irap_pic_flag equal to 1 specifies that the current picture is a GDR or TRAP picture. gdr_or_irap_pic_flag equal to 0 specifies that the current picture may or may not be a GDR or TRAP picture. <ADD>When gdr_irap_pic_flag is not present, it is inferred to be equal to 0. </ADD>

In some examples, video encoder 200 and video decoder 300 may be configured to operate according to a constraint where the semantics of gdr_or_irap_pic_flag are constrained such that gdr_or_irap_pic_flag shall be 0 when a mixed NAL unit type presence is indicated. An example implementation of these techniques is shown below as changes relative to VVC draft 8:

gdr_or_irap_pic_flag equal to 1 specifies that the current picture is a GDR or TRAP picture. gdr_or_irap_pic_flag equal to 0 specifies that the current picture may or may not be a GDR or IRAP picture. <ADD>gdr_irap_pic_flag shall be equal to 0 when mixed_nalu_types_in_pic_flag is equal to 1. </ADD>

In accordance with the techniques introduced above, video encoder 200 may be configured to determine that reference picture list information is included in a PH syntax structure and generate a first syntax element, such as rpl_info_in_ph_flag above to indicate that the reference picture list information is included in the PH syntax structure. Video encoder 200 may generate a second syntax element, such as ph_collocated_from_l0_flag above, for inclusion in the PH syntax structure, with a first value (e.g., 0) for the second syntax element indicating that a collocated picture used for temporal motion vector prediction is to be derived from a first reference picture list (e.g., l0) and a second value (e.g., 1) for the second syntax element indicating that the collocated picture used for the temporal motion vector prediction is to be derived from a second reference picture list (e.g., l1). Video encoder 200 may determine that a slice of the video data that refers to the PH syntax structure is a P slice and in response to the slice being a P slice, determine that a value for a third syntax element associated with the slice, such as slice_collocated_from_l0_flag), is equal to a first value for the third syntax element, with the first value (e.g., 0) for the third syntax element indicating that the collocated picture used for temporal motion vector prediction is to be derived from the first reference picture list (e.g., l0) and a second value (e.g., 1) for the third syntax element indicating that the collocated picture used for the temporal motion vector prediction is to be derived from the second reference picture list (e.g., l1). Video encoder 200 may output a bitstream of encoded video data that includes the first syntax element and the PH syntax structure.

In accordance with such a technique, video decoder 300 may be configured to receive a first syntax element, such as rpl_info_in_ph_flag above, indicating that reference picture list information is included in a PH syntax structure, and in response, receive a second syntax element, such as ph_collocated_from_l0_flag above in the PH syntax structure. For the second syntax element, a first value (e.g., 0) may indicate that a collocated picture used for temporal motion vector prediction is to be derived from a first reference picture list (e.g., l0), and a second value (e.g., 1) may indicate that the collocated picture used for the temporal motion vector prediction is to be derived from a second reference picture list (e.g., l1). Video decoder 300 may receive a slice of the video data that refers to the PH syntax structure and in response to the slice being a P slice, set a value for a third syntax element associated with the slice, such as slice_collocated_from_l0_flag above, to a first value. The first value (e.g., 0) for the third syntax element may indicate that the collocated picture used for temporal motion vector prediction is to be derived from the first reference picture list (e.g., l0), whereas a second value (e.g., 1) for the third syntax element would indicate that the collocated picture used for the temporal motion vector prediction is to be derived from the second reference picture list (e.g., l1).

Video decoder 300 may additionally be configured to receive, in response to receiving the first syntax element indicating that reference picture list information is included in the picture header syntax structure and in response to the slice being the P slice, an instance of a fourth syntax element, where a first value for the fourth syntax element indicates a fifth syntax element is included in the slice header and a second value for the fourth syntax element indicates the fifth syntax element is not included in the slice header. In response to the instance of the fourth syntax element being equal to the first value for the fourth syntax element, video decoder 300 may receive an instance of the fifth syntax element and determine a number of active reference pictures for the slice based on a value for the instance of the fifth syntax element.

Figure 3:
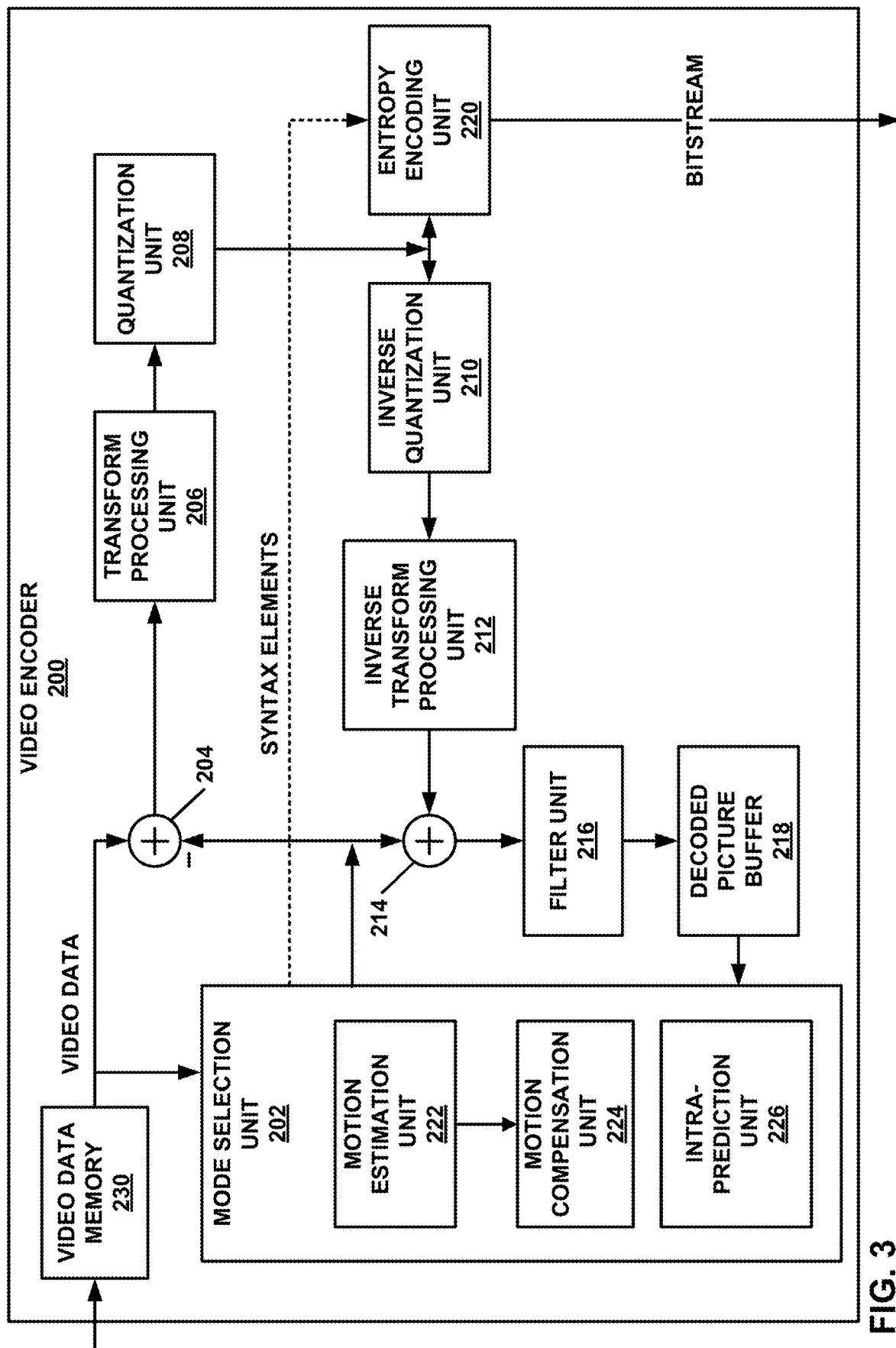
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform the techniques of this disclosure, including the techniques of the claims below.

Figure 4:
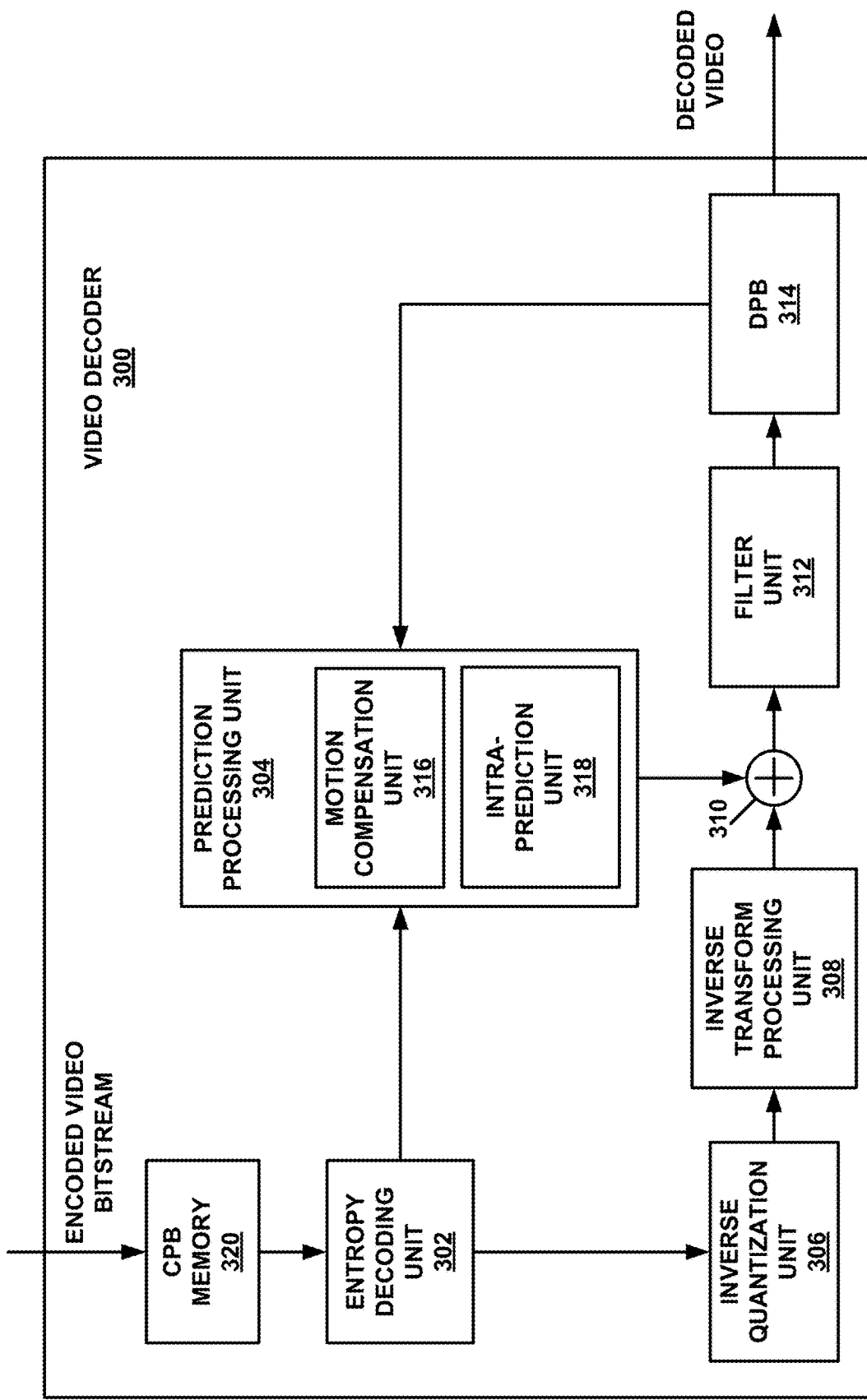
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform the techniques of this disclosure, including the techniques of the claims below.

Figure 5:
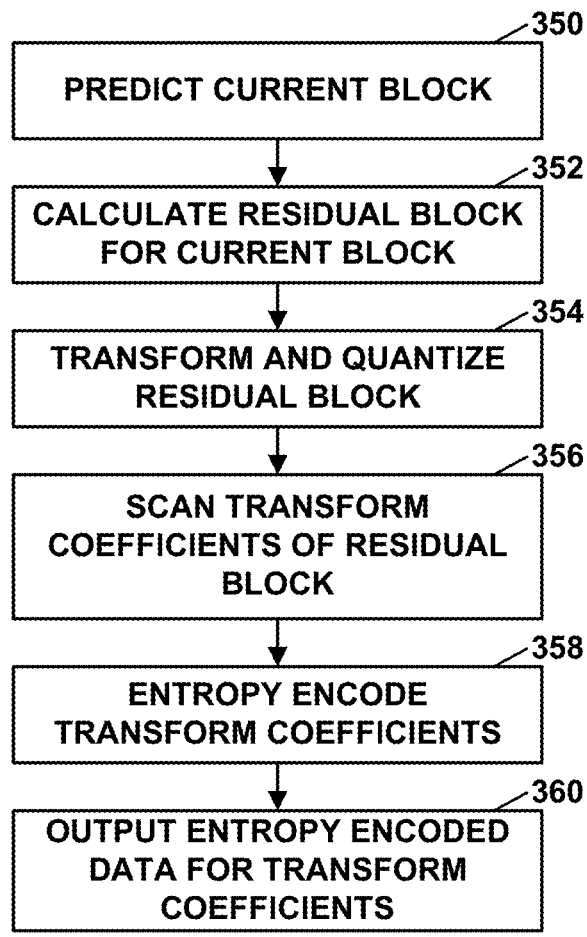
FIG. 5 is a flowchart illustrating an example video encoding process.

FIG. 5 is a flowchart illustrating an example method for encoding a current block. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 6:
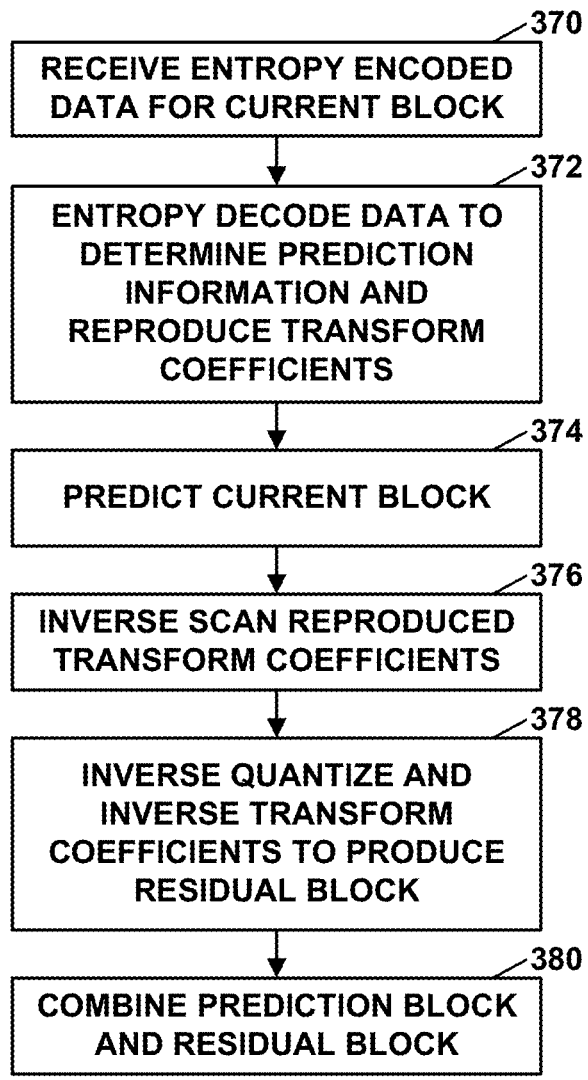
FIG. 6 is a flowchart illustrating an example video decoding process.

FIG. 6 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 6.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 7:
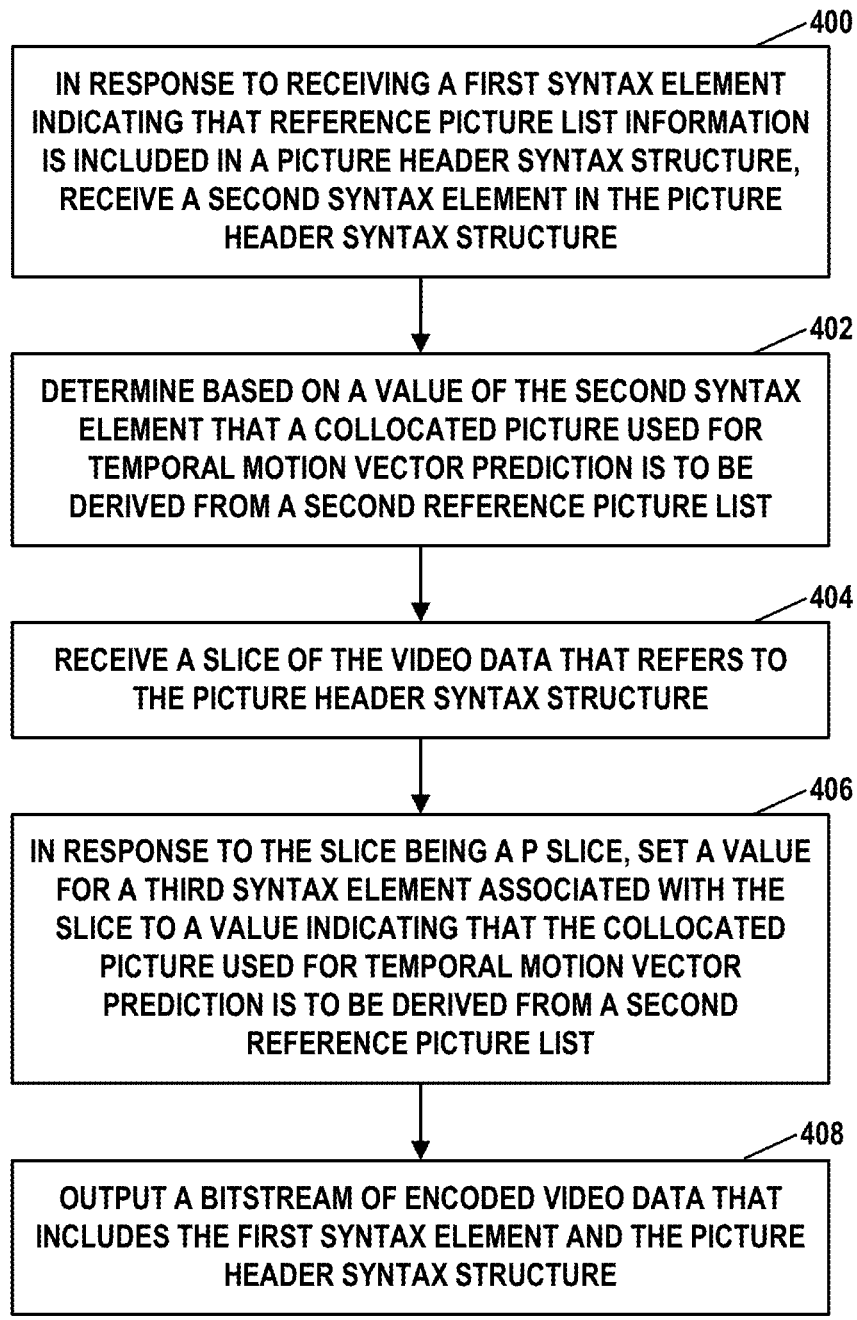
FIG. 7 is a flowchart illustrating an example video encoding process.

FIG. 7 is a flowchart illustrating an example method for encoding a current block. The current block may comprise a current CU. Although described with respect to video encoder 200 (FIGS. 1 and 3), it should be understood that other devices may be configured to perform a method similar to that of FIG. 7.

In the example of FIG. 7, in response to determining that reference picture list information is included in a PH syntax structure, video encoder 200 generates a first syntax element, such as rpl_info_in_ph_flag above, indicating that the reference picture list information is included in the PH syntax structure (400).

Video encoder 200 generates a second syntax element, such as ph_collocated_from_l0_flag, for inclusion in the PH syntax structure, set to a value to indicate that a collocated picture used for the temporal motion vector prediction is to be derived from a second reference picture list (e.g., l1) of two reference picture lists (402). Video encoder 200 determines that a slice of the video data that refers to the PH syntax structure is a P slice (404). In response to the slice being a P slice, video encoder 200 determines that a value for a third syntax element associated with the slice, such as slice_collocated_from_l0_flag, is equal to a value indicating that the collocated picture used for temporal motion vector prediction is to be derived from a first reference picture list (e.g., l0) of the two reference picture lists (406). Video encoder 200 outputs a bitstream of encoded video data that includes the first syntax element and the PH syntax structure (408).

Figure 8:
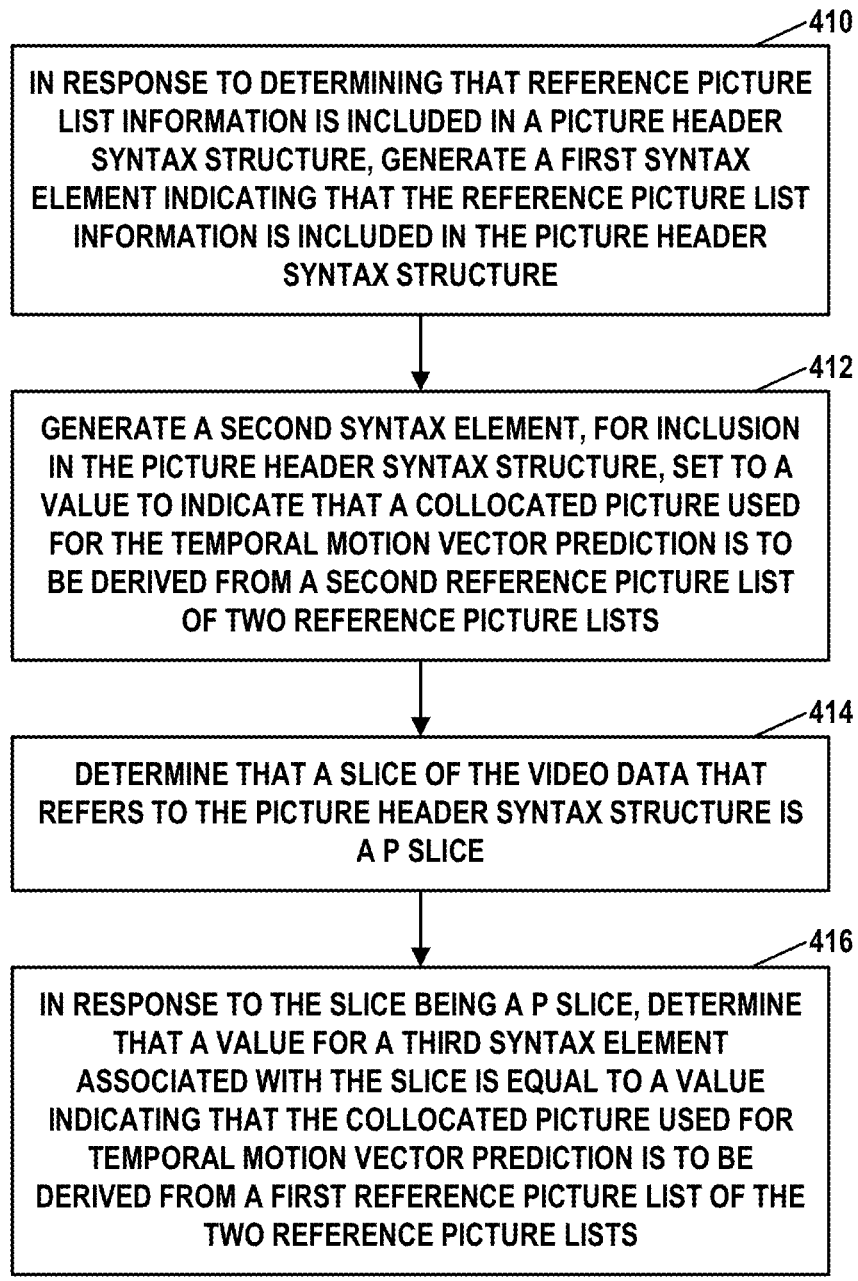
FIG. 8 is a flowchart illustrating an example video decoding process.

FIG. 8 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 8.

In the example of FIG. 8, in response to receiving a first syntax element, such as e.g., rpl_info_in_ph_flag, indicating that reference picture list information is included in a PH syntax structure, video decoder 300 receives a second syntax element, such as ph_collocated_from_l0_flag, in the PH syntax structure (410). Video decoder 300 determines based on a value of the second syntax element that a collocated picture used for temporal motion vector prediction is to be derived from a second reference picture list (e.g., l1) (412). Video decoder 300 receives a slice of the video data that refers to the PH syntax structure (414). In response to the slice being a P slice, video decoder 300 sets a value for a third syntax element associated with the slice, such as slice_collocated_from_l0_flag, to a value indicating that the collocated picture used for temporal motion vector prediction is to be derived from a second reference picture list (416).

Video decoder 300 may decode a slice of the video data based on the value for the third syntax element. For example, for a block of the slice, video decoder 300 may determine a temporal motion vector candidate for inclusion in a motion vector candidate list. To determine a temporal motion vector candidate for inclusion in a motion vector candidate list, video decoder 300 may identify the collocated picture used for the temporal motion vector prediction from the first reference picture list; identify a collocated block in the collocated picture; and derive the temporal motion vector candidate based on a motion vector used to decode the collocated block.

Video decoder 300 may output decoded video data that includes a decoded version of the slice. For example, video decoder 300 may output, for display or for storage, a decoded picture that includes the decoded slice.

The following clauses represent example implementations of the techniques and devices introduced above.

Clause 1: A method of decoding video data, the method comprising: receiving a first syntax element; in response to the first syntax element indicating that reference picture list information is included in a picture header syntax structure, receiving a second syntax element in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; receiving a slice of the video data that refers to the picture header syntax structure; and in response to the slice being a P slice, setting a value for a third syntax element associated with the slice to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list.

Clause 2: The method of clause 1, wherein a value for the second syntax element is equal to the second value for the second syntax element.

Clause 3: The method of clause 1 or 2, wherein setting the value for the third syntax element associated with the slice to the second value comprises inferring the value for the second flag to be the second value.

Clause 4: The method of any of clauses 1-3, wherein setting the value for the third syntax element associated with the slice to the second value comprises, setting the value for the third syntax element to be the second value without receiving an instance of the third syntax element in a slice header of the slice.

Clause 5: The method of any clauses 1-4, further comprising: for a block of the slice, determining a temporal motion vector candidate for inclusion in a motion vector candidate list, wherein determining the temporal motion vector candidate comprises: identifying the collocated picture used for the temporal motion vector prediction from the first reference picture list; identifying a collocated block in the collocated picture; and deriving the temporal motion vector candidate based on a motion vector used to decode the collocated block.

Clause 6: The method of any of clauses 1-5, further comprising: in response to receiving the first syntax element indicating that reference picture list information is included in the picture header syntax structure and in response to the slice being the P slice, receiving an instance of a fourth syntax element, wherein a first value for the fourth syntax element indicates a fifth syntax element is included in the slice header and a second value for the fourth syntax element indicates the fifth syntax element is not included in the slice header; in response to the instance of the fourth syntax element being equal to the first value for the fourth syntax element, receiving an instance of the fifth syntax element; and determining a number of active reference pictures for the slice based on a value for the instance of the fifth syntax element.

Clause 7: The method of clause 6, wherein the slice is a first slice, the instance of the fourth syntax element is a first instance of the fourth syntax element, the instance of the fifth syntax element is a first instance of the fifth syntax element, the method further comprising: receiving a second slice of the video data that refers to the picture header syntax structure; and in response to receiving the first syntax element indicating that reference picture list information is included in the picture header syntax structure and in response to the second slice being an I slice, receiving a slice header, without a second instance of the fourth syntax element, for the second slice.

Clause 8: A device for decoding video data, the device comprising: a memory configured to store video data; and one or more processors implemented in circuitry and configured to: receive a first syntax element; in response to the first syntax element indicating that reference picture list information is included in a picture header syntax structure, receive a second syntax element in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; receive a slice of the video data that refers to the picture header syntax structure; and in response to the slice being a P slice, set a value for a third syntax element associated with the slice to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list.

Clause 9: The device of clause 8, wherein a value for the second syntax element is equal to the second value for the second syntax element.

Clause 10: The device of clause 8 or 9, wherein to set the value for the third syntax element associated with the slice to the second value, the one or more processors are further configured to infer the value for the third syntax element to be the second value.

Clause 11: The device of any of clauses 8-10, wherein to set the value for the third syntax element associated with the slice to the second value comprises, the one or more processors are further configured to set the value for the third syntax element to be the second value without receiving an instance of the third syntax element in a slice header of the slice.

Clause 12: The device of any of clauses 8-11, wherein the one or more processors are further configured to: for a block of the slice, determine a temporal motion vector candidate for inclusion in a motion vector candidate list, wherein to determine the temporal motion vector candidate, the one or more processors are further configured to: identify the collocated picture used for the temporal motion vector prediction from the first reference picture list; identify a collocated block in the collocated picture; and derive the temporal motion vector candidate based on a motion vector used to decode the collocated block.

Clause 13: The device of any of clauses 8-12, wherein the one or more processors are further configured to: in response to receiving the first syntax element indicating that reference picture list information is included in the picture header syntax structure and in response to the slice being the P slice, receive an instance of a fourth syntax element, wherein a first value for the fourth syntax element indicates a fifth syntax element is included in the slice header and a second value for the fourth syntax element indicates the fifth syntax element is not included in the slice header; in response to the instance of the fourth syntax element being equal to the first value for the fourth syntax element, receive an instance of the fifth syntax element; and determine a number of active reference pictures for the slice based on a value for the instance of the fifth syntax element.

Clause 14: The device of clause 13, wherein the slice is a first slice, the instance of the fourth syntax element is a first instance of the fourth syntax element, the instance of the fifth syntax element is a first instance of the fifth syntax element, wherein the one or more processors are further configured to: receive a second slice of the video data that refers to the picture header syntax structure; in response to receiving the first syntax element indicating that reference picture list information is included in the picture header syntax structure and in response to the second slice being an I slice, receive a slice header, without a second instance of the fourth syntax element, for the second slice.

Clause 15: The device of any of clauses 8-14, wherein the device comprises a wireless communication device, further comprising a receiver configured to receive encoded video data.

Clause 16: The device of clause 15, wherein the wireless communication device comprises a telephone handset and wherein the receiver is configured to demodulate, according to a wireless communication standard, a signal comprising the encoded video data.

Clause 17: The device of any of clauses 8-16, further comprising: a display configured to display decoded video data.

Clause 18: The device of any of clauses 8-17, wherein the device comprises one or more of a camera, a computer, a mobile device, a broadcast receiver device, or a set-top box.

Clause 19: A method of encoding video data, the method comprising: in response to determining that reference picture list information is included in a picture header syntax structure, generating a first syntax element indicating that the reference picture list information is included in the picture header syntax structure; generating a second syntax element for inclusion in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; determining that a slice of the video data that refers to the picture header syntax structure is a P slice; in response to the slice being the P slice, determining that a value for a third syntax element associated with the slice is equal to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list; and outputting a bitstream of encoded video data that includes the first syntax element and the picture header syntax structure.

Clause 20: The method of clause 19, wherein a value for the second syntax element is equal to the second value for the second syntax element.

Clause 21: The method of clause 19 or 20, further comprising: generating, for inclusion in the bitstream of encoded video data, a slice header for the slice without including in the slice header an instance of the third syntax element.

Clause 22: The method of any of clauses 19-21, further comprising: for a block of the slice, determining a temporal motion vector candidate for inclusion in a motion vector candidate list, wherein determining the temporal motion vector candidate comprises: identifying the collocated picture used for the temporal motion vector prediction from the first reference picture list; identifying a collocated block in the collocated picture; and deriving the temporal motion vector candidate based on a motion vector used to decode the collocated block.

Clause 23: The method of any of clauses 19-22, further comprising: in response to determining that the reference picture list information is included in the picture header syntax structure and in response to determining that the slice is the P slice, generate an instance of a fourth syntax element, wherein a first value for the fourth syntax element indicates a fifth syntax element is included in the slice header and a second value for the fourth syntax element indicates the fifth syntax element is not included in the slice header; determining a number of active reference pictures for the slice; and in response to the instance of the fourth syntax element being equal to the first value for the fourth syntax element, generating, for inclusion in the bitstream of encoded video data, an instance of the fifth syntax element, wherein a value for the instance of the fifth syntax element indicates the number of active reference pictures for the slice.

Clause 24: The method of clause 23, wherein the slice is a first slice, the instance of the fourth syntax element is a first instance of the fourth syntax element, the instance of the fifth syntax element is a first instance of the fifth syntax element, the method further comprising: for a second slice of the video data that refers to the picture header syntax structure, in response to determining that reference picture list information is included in the picture header syntax structure and in response to the second slice being an I slice, generating, for inclusion in the bitstream of encoded video data, a slice header without a second instance of the fourth syntax element.

Clause 25: A device for encoding video data, the device comprising: a memory configured to store video data; and one or more processors implemented in circuitry and configured to: in response to determining that reference picture list information is included in a picture header syntax structure, generate a first syntax element indicating that the reference picture list information is included in the picture header syntax structure; generate a second syntax element for inclusion in the picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; determine that a slice of the video data that refers to the picture header syntax structure is a P slice; in response to the slice being the P slice, determine that a value for a third syntax element associated with the slice is equal to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list; and output a bitstream of encoded video data that includes the first syntax element and the picture header syntax structure.

Clause 26: The device of clause 25, wherein a value for the second syntax element is equal to the second value for the second syntax element.

Clause 27: The device of clause 25 or 26, further comprising: generating, for inclusion in the bitstream of encoded video data, a slice header for the slice without including in the slice header an instance of the third syntax element.

Clause 28: The device of any of clauses 25-27, further comprising: for a block of the slice, determining a temporal motion vector candidate for inclusion in a motion vector candidate list, wherein determining the temporal motion vector candidate comprises: identifying the collocated picture used for the temporal motion vector prediction from the first reference picture list; identifying a collocated block in the collocated picture; and deriving the temporal motion vector candidate based on a motion vector used to decode the collocated block.

Clause 29: The device of any of clauses 25-28, further comprising: in response to determining that the reference picture list information is included in the picture header syntax structure and in response to determining that the slice is a P slice, generate an instance of a fourth syntax element, wherein a first value for the fourth syntax element indicates a fifth syntax element is included in the slice header and a second value for the fourth syntax element indicates the fifth syntax element is not included in the slice header; determining a number of active reference pictures for the slice; and in response to the instance of the fourth syntax element being equal to the first value for the fourth syntax element, generating, for inclusion in the bitstream of encoded video data, an instance of the fifth syntax element, wherein a value for the instance of the fifth syntax element indicates the number of active reference pictures for the slice.

Clause 30: The device of clause 29, wherein the slice is a first slice, the instance of the fourth syntax element is a first instance of the fourth syntax element, the instance of the fifth syntax element is a first instance of the fifth syntax element, the method further comprising: for a second slice of the video data that refers to the picture header syntax structure, in response to determining that reference picture list information is included in the picture header syntax structure and in response to the second slice being an I slice, generating, for inclusion in the bitstream of encoded video data, a slice header without a second instance of the fourth syntax element.

Clause 31: The device of any of clauses 25-30, wherein the device comprises a wireless communication device, further comprising a transmitted configured to transmit encoded video data.

Clause 32: The device of clause 31, wherein the wireless communication device comprises a telephone handset and wherein the transmitter is configured to modulate, according to a wireless communication standard, a signal comprising the encoded video data.

Clause 33: The device of any of clauses 25-32, further comprising: a camera configured to capture the video data.

Clause 34: The device of any of clauses 25-33, wherein the device comprises one or more of a camera, a computer, or a mobile device.

Clause 35: A method of decoding video data, the method comprising: receiving a first flag; receiving a second flag; determining if a reference picture list is signaled in a syntax structure of the video data based on the first and the second flag.

Clause 36: The method of clause 35, wherein the first flag indicates whether or not inter slices are allowed for a picture.

Clause 37: The method of clause 35 or 36, wherein the second flag indicates if reference picture list syntax elements are present in slice headers of instantaneous decoder refresh pictures.

Clause 38: The method of any combination of clauses 35-37, wherein determining if the reference picture list is signaled in the data structure of the video data based on the first and the second flag comprises determining that the reference picture list is signaled in the data structure of the video data in response to at least one of the first flag or the second flag being true.

Clause 39: The method of any combination of clauses 35-37, further comprising: receiving a third flag indicating if reference picture list information is present in a picture header syntax structure or in slice headers.

Clause 40: The method of clause 39, wherein determining if the reference picture list is signaled in the data structure of the video data based on the first and the second flag comprises determining that the reference picture list is signaled in the data structure of the video data in response to (1) at least one of the first flag or the second flag being true and (2) the third flag being true.

Clause 41: The method of any combination of clauses 35-40, wherein the syntax structure comprises a picture header syntax structure.

Clause 42: A method of coding video data, the method comprising: receiving a first flag; receiving a second flag; determining if a weighted prediction table is signaled in a syntax structure of the video data based on the first and the second flag.

Clause 43: The method of clause 42, wherein the first flag indicates whether or not inter slices are allowed for a picture.

Clause 44: The method of clause 42 or 43, wherein the second flag indicates if reference picture list syntax elements are present in slice headers of instantaneous decoder refresh pictures.

Clause 45: The method of any combination of clauses 42-44, wherein determining if the weighted prediction table is signaled in the data structure of the video data based on the first and the second flag comprises determining that the weighted prediction table is signaled in the data structure of the video data in response to at least one of the first flag or the second flag being true.

Clause 46: The method of any combination of clauses 42-45, further comprising: receiving a third flag indicating if weighted prediction is applied.

Clause 47: The method of clause 46, wherein determining if the weighted prediction table is signaled in the data structure of the video data based on the first and the second flag comprises determining that the reference picture list is signaled in the data structure of the video data in response to (1) at least one of the first flag or the second flag being true, and (2) the third flag being true.

Clause 48: The method of any combination of clauses 42-47 wherein the syntax structure comprises a picture header syntax structure.

Clause 49: A device for coding video data, the device comprising one or more means for performing the method of any combination of clauses 35-48.

Clause 50: The device of clause 49, wherein the one or more means comprise one or more processors implemented in circuitry.

Clause 51: The device of any of clauses 49 and 50, further comprising a memory to store the video data.

Clause 52: The device of any of clauses 49-51, further comprising a display configured to display decoded video data.

Clause 53: The device of any of clauses 49-52, wherein the device comprises one or more of a camera, a computer, a mobile device, a broadcast receiver device, or a set-top box.

Clause 54: The device of any of clauses 49-53, wherein the device comprises a video decoder.

Clause 55: The device of any of clauses 49-54, wherein the device comprises a video encoder.

Clause 56: A computer-readable storage medium having stored thereon instructions that, when executed, cause one or more processors to perform the method of any of clauses 35-48.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

receiving a first syntax element that indicates that reference picture list information is included in a first picture header syntax structure for a first slice and included in a second picture header syntax structure for a second slice;

in response to the first syntax element, receiving a second syntax element in the first picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list;

in response to the first slice being a P slice, setting a value for a first instance of a third syntax element associated with the first slice to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list;

after receiving the first syntax element indicating that reference picture list information is included in the first picture header syntax structure and in response to the first slice being the P slice, receiving a fourth syntax element, wherein a first value for the fourth syntax element indicates that a fifth syntax element is included in a first slice header for the first slice and a second value for the fourth syntax element indicates that the fifth syntax element is not included in the first slice header;

in response to the fourth syntax element being equal to the first value for the fourth syntax element, receiving the fifth syntax element;

determining a number of active reference pictures for the first slice based on a value for the instance of the fifth syntax element; and in response to receiving the first syntax element indicating that reference picture list information is included in the second picture header syntax structure and in response to the second slice being an I slice, receiving a second slice header, without a second instance of the third syntax element, for the second slice.

2. The method of claim 1, wherein a value for the second syntax element is equal to the second value for the second syntax element.

3. The method of claim 1, wherein setting the value for the first instance of the third syntax element associated with the first slice to the second value comprises inferring the value for the first instance of the third syntax element to be the second value.

4. The method of claim 1, wherein setting the value for the first instance of the third syntax element associated with the first slice to the second value comprises, setting the value for the first instance of the third syntax element to be the second value without receiving an instance of the third syntax element in the first slice header of the first slice.

5. The method of claim 1, further comprising:
for a block of the first slice, determining a temporal motion vector candidate for inclusion in a motion vector candidate list, wherein determining the temporal motion vector candidate comprises:
identifying the collocated picture used for the temporal motion vector prediction from the first reference picture list;
identifying a collocated block in the collocated picture; and
deriving the temporal motion vector candidate based on a motion vector used to decode the collocated block.

6. A device for decoding video data, the device comprising:
a memory configured to store video data; and
one or more processors implemented in circuitry and configured to:
receive a first syntax element that indicates that reference picture list information is included in a first picture header syntax structure for a first slice and included in a second picture header syntax structure for a second slice;
in response to the first syntax element, receive a second syntax element in the first picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list;
in response to the first slice being a P slice, set a value for a first instance of a third syntax element associated with the first slice to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list;
after receiving the first syntax element indicating that reference picture list information is included in the first picture header syntax structure and in response to the first slice being the P slice, receive a fourth syntax element, wherein a first value for the fourth syntax element indicates that a fifth syntax element is included in a first slice header for the first slice and a second value for the fourth syntax element indicates that the fifth syntax element is not included in the first slice header;
in response to the fourth syntax element being equal to the first value for the fourth syntax element, receive the fifth syntax element;
determine a number of active reference pictures for the first slice based on a value for the fifth syntax element; and
in response to receiving the first syntax element indicating that reference picture list information is included in the second picture header syntax structure and in response to the second slice being an I slice, receive a second slice header, without a second instance of the third syntax element, for the second slice.

7. The device of claim 6, wherein a value for the second syntax element is equal to the second value for the second syntax element.

8. The device of claim 6, wherein to set the value for the first instance of the third syntax element associated with the first slice to the second value, the one or more processors are further configured to infer the value for the first instance of the third syntax element to be the second value.

9. The device of claim 6, wherein to set the value for the first instance of the third syntax element associated with the first slice to the second value comprises, the one or more processors are further configured to set the value for the first instance of the the third syntax element to be the second value without receiving an instance of the third syntax element in the first slice header of the first slice.

10. The device of claim 6, wherein the one or more processors are further configured to:
for a block of the first slice, determine a temporal motion vector candidate for inclusion in a motion vector candidate list, wherein to determine the temporal motion vector candidate, the one or more processors are further configured to:
identify the collocated picture used for the temporal motion vector prediction from the first reference picture list;
identify a collocated block in the collocated picture; and
derive the temporal motion vector candidate based on a motion vector used to decode the collocated block.

11. The device of claim 6, wherein the device comprises a wireless communication device, further comprising a receiver configured to receive encoded video data.

12. The device of claim 11, wherein the wireless communication device comprises a telephone handset and wherein the receiver is configured to demodulate, according to a wireless communication standard, a signal comprising the encoded video data.

13. The device of claim 6, further comprising:
a display configured to display decoded video data.

14. The device of claim 6, wherein the device comprises one or more of a camera, a computer, a mobile device, a broadcast receiver device, or a set-top box.

15. A method of encoding video data, the method comprising: in response to determining that reference picture list information is included in a first picture header syntax structure for a first slice and included in a second picture header sytnax structure for a second slice, generating a first syntax element indicating that the reference picture list information is included in the first picture header syntax structure and the second picture header syntax structure; generating a second syntax element for inclusion in the first picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list; determining that a first slice of the video data that refers to the first picture header syntax structure is a P slice; in response to the first slice being the P slice, determining that a value for a first instance of a third syntax element associated with the first slice is equal to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list; and outputting a bitstream of encoded video data that includes the first syntax element and the picture header syntax structure; after determining that the reference picture list information is included in the first picture header syntax structure and in response to determining that the first slice is the P slice, generating a fourth syntax clement, wherein a first value for the fourth syntax element indicates a fifth syntax clement is included in a first slice header for the first slice and a second value for the fourth syntax element indicates the fifth syntax element is not included in the first slice header; determining a number of active reference pictures for the first slice; in response to the first instance of the fourth syntax element being equal to the first value for the fourth syntax element, generating, for in the bitstream of encoded video data, the fifth syntax element, wherein a value for the fifth syntax element indicates the number of active reference pictures for the first slice; and for the second slice of the video data that refers to the second picture header syntax structure, in response to determining that reference picture list information is included in the second picture header syntax structure and in response to the second slice being an I slice, generating, for inclusion in the bitstream of encoded video data, a second slice header without a second instance of the third syntax element.

16. The method of claim 15, wherein a value for the second syntax element is equal to the second value for the second syntax element.

17. The method of claim 15, further comprising:
generating, for inclusion in the bitstream of encoded video data, the first slice header for the first slice without including in the first slice header an instance of the third syntax element.

18. The method of claim 15, further comprising:
for a block of the first slice, determining a temporal motion vector candidate for inclusion in a motion vector candidate list, wherein determining the temporal motion vector candidate comprises:
identifying the collocated picture used for the temporal motion vector prediction from the first reference picture list;
identifying a collocated block in the collocated picture; and
deriving the temporal motion vector candidate based on a motion vector used to decode the collocated block.

19. A device for encoding video data, the device comprising:
a memory configured to store video data; and
one or more processors implemented in circuitry and configured to:
in response to determining that reference picture list information is included in a first picture header syntax structure for a first slice and included in a second picture header sytnax structure for a second slice, generate a first syntax element indicating that the reference picture list information is included in the first picture header syntax structure and the second picture header syntax structure;
generate a second syntax element for inclusion in the first picture header syntax structure, wherein a first value for the second syntax element indicates that a collocated picture used for temporal motion vector prediction is to be derived from a first reference picture list and a second value for the second syntax element indicates that the collocated picture used for the temporal motion vector prediction is to be derived from a second reference picture list;
determine that a first slice of the video data that refers to the first picture header syntax structure is a P slice;
in response to the first slice being the P slice, determine that a value for a first instance of a third syntax element associated with the firs slice is equal to a first value for the third syntax element, wherein the first value for the third syntax element indicates that the collocated picture used for temporal motion vector prediction is to be derived from the first reference picture list and a second value for the third syntax element indicates that the collocated picture used for the temporal motion vector prediction is to be derived from the second reference picture list; and
outputting a bitstream of encoded video data that includes the first syntax element and the picture header syntax structure;
after determining that the reference picture list information is included in the first picture header syntax structure and in response to determining that the first slice is the P slice, generate a fourth syntax element, wherein a first value for the fourth syntax element indicates a fifth syntax element is included in a first slice header for the first slice and a second value for the fourth syntax element indicates the fifth syntax element is not included in the first slice header;
determine a number of active reference pictures for the first slice;
in response to the first instance of the fourth syntax element being equal to the first value for the fourth syntax element, generate, for inclusion in the bitstream of encoded video data, the fifth syntax element, wherein a value for the fifth syntax element indicates the number of active reference pictures for the first slice; and
for the second slice of the video data that refers to the second picture header syntax structure, in response to determining that reference picture list information is included in the second picture header syntax structure and in response to the second slice being an I slice, generate, for inclusion in the bitstream of encoded video data, a second slice header without a second instance of the third syntax element.

20. The device of claim 19, wherein a value for the second syntax element is equal to the second value for the second syntax element.

21. The device of claim 19, wherein the one or more processors are further configured to:
generate, for inclusion in the bitstream of encoded video data, the first slice header for the first slice without including in the first slice header an instance of the third syntax element.

22. The device of claim 19, wherein the one or more processors are further configured to:
- for a block of the first slice, determine a temporal motion vector candidate for inclusion in a motion vector candidate list, wherein determining the temporal motion vector candidate comprises:
- identify the collocated picture used for the temporal motion vector prediction from the first reference picture list;
- identify a collocated block in the collocated picture; and
- derive the temporal motion vector candidate based on a motion vector used to decode the collocated block.

23. The device of claim 19, wherein the device comprises a wireless communication device, further comprising a transmitted configured to transmit encoded video data.

24. The device of claim 23, wherein the wireless communication device comprises a telephone handset and wherein the transmitter is configured to modulate, according to a wireless communication standard, a signal comprising the encoded video data.

25. The device of claim 19, further comprising:
- a camera configured to capture the video data.

26. The device of claim 19, wherein the device comprises one or more of a camera, a computer, or a mobile device.

* * * * *